(12) United States Patent
Hosoi et al.

(10) Patent No.: US 11,526,033 B2
(45) Date of Patent: Dec. 13, 2022

(54) HEARING DEVICE

(71) Applicant: Finewell Co., Ltd., Osaka (JP)

(72) Inventors: Hiroshi Hosoi, Osaka (JP); Yoji Hosoi, Osaka (JP)

(73) Assignee: Finewell Co., Ltd., Osaka (JP)

( * ) Notice: Subject to any disclaimer, the term of this patent is extended or adjusted under 35 U.S.C. 154(b) by 0 days.

(21) Appl. No.: 17/266,456

(22) PCT Filed: Sep. 26, 2019

(86) PCT No.: PCT/JP2019/037808
§ 371 (c)(1),
(2) Date: Feb. 5, 2021

(87) PCT Pub. No.: WO2020/067263
PCT Pub. Date: Apr. 20, 2020

(65) Prior Publication Data
US 2021/0294127 A1    Sep. 23, 2021

(30) Foreign Application Priority Data
Sep. 28, 2018  (JP) .............................. JP2018-184709

(51) Int. Cl.
*H04R 25/00*    (2006.01)
*G02C 11/06*    (2006.01)
(Continued)

(52) U.S. Cl.
CPC .............. *G02C 11/06* (2013.01); *G02C 5/143* (2013.01); *G02C 5/20* (2013.01); *H04R 25/606* (2013.01);
(Continued)

(58) Field of Classification Search
CPC ... H04R 25/606; H04R 2460/13; G02C 11/06
See application file for complete search history.

(56) References Cited

U.S. PATENT DOCUMENTS

| | | | | |
|---|---|---|---|---|
| 1,823,228 A | * | 9/1931 | Apfel ..................... | G02C 11/06 381/381 |
| 1,897,833 A | * | 2/1933 | Benway ................. | G02C 11/06 381/381 |

(Continued)

FOREIGN PATENT DOCUMENTS

| | | |
|---|---|---|
| CN | 2198618 | 5/1995 |
| CN | 1110857 | 10/1995 |

(Continued)

OTHER PUBLICATIONS

EP Partial Search Report in European Appln. No. 20190381.2, dated Nov. 20, 2020, 19 pages.

(Continued)

*Primary Examiner* — Ryan Robinson
(74) *Attorney, Agent, or Firm* — Fish & Richardson P.C.

(57) ABSTRACT

This hearing device, for example, includes a vibrator for transmitting vibration corresponding to a voice signal to the nasal bone of a user to let the user hear sound. The hearing device may further preferably include an eyeglass-type housing for carrying the vibrator in a position at which a nose pad is provided. The hearing device may also preferably incorporate a voice signal reception unit for receiving, wirelessly or by wire, a voice signal generated by an external sound source, or an internal sound source for self-generating a voice signal. When implementation as a hearing aid or a sound collector is contemplated, the external sound source or the internal sound source may preferably be a microphone for collecting ambient sound.

1 Claim, 8 Drawing Sheets

(51) Int. Cl.
*G02C 5/14* (2006.01)
*G02C 5/20* (2006.01)
(52) U.S. Cl.
CPC ....... *H04R 25/607* (2019.05); *H04R 2225/41* (2013.01); *H04R 2460/13* (2013.01)

(56) References Cited

U.S. PATENT DOCUMENTS

| | | | |
|---|---|---|---|
| 2,045,404 | A | 6/1936 | Nicholides |
| 2,765,373 | A * | 10/1956 | Smith .................... G02C 11/06 455/344 |
| 4,351,166 | A | 9/1982 | Belin |
| 5,125,032 | A | 6/1992 | Meister |
| RE34,525 | E | 2/1994 | Lazzaroni |
| 5,295,193 | A | 3/1994 | Ono |
| 5,323,468 | A | 6/1994 | Bottesch |
| 5,396,563 | A | 3/1995 | Yoshimi |
| 5,682,173 | A | 10/1997 | Holakovszky et al. |
| 5,686,882 | A | 11/1997 | Giani |
| 5,687,244 | A | 11/1997 | Untersander |
| 5,956,682 | A | 9/1999 | Loudermilk |
| 5,986,813 | A | 11/1999 | Saikawa |
| 6,028,556 | A | 2/2000 | Shiraki |
| 6,380,923 | B1 | 4/2002 | Fukumoto et al. |
| 6,456,721 | B1 | 9/2002 | Fukuda |
| 6,463,157 | B1 | 10/2002 | May |
| 6,483,917 | B1 | 11/2002 | Kang et al. |
| 6,603,863 | B1 | 8/2003 | Nagayoshi |
| 6,754,359 | B1 | 6/2004 | Svean |
| 6,825,830 | B1 | 11/2004 | Kanesaka et al. |
| 6,912,287 | B1 | 6/2005 | Fukumoto et al. |
| 6,950,126 | B1 | 9/2005 | Homma et al. |
| 6,957,049 | B1 | 10/2005 | Takeda |
| 7,231,235 | B2 | 6/2007 | Harrold |
| 7,257,372 | B2 | 8/2007 | Kaltenbach |
| 7,437,122 | B2 | 10/2008 | Choi |
| 7,442,164 | B2 | 10/2008 | Berrang et al. |
| 7,555,136 | B2 * | 6/2009 | Wang .................... G02C 11/06 381/381 |
| 7,616,771 | B2 | 11/2009 | Lenhardt |
| 7,783,034 | B2 | 8/2010 | Manne |
| 7,822,215 | B2 | 10/2010 | Carazo |
| 7,890,147 | B2 | 2/2011 | Tanada |
| 8,194,875 | B2 | 6/2012 | Miranda |
| 8,238,967 | B1 | 8/2012 | Arnold et al. |
| 8,433,080 | B2 | 4/2013 | Rader |
| 8,521,239 | B2 | 8/2013 | Hosoi et al. |
| 8,526,646 | B2 | 9/2013 | Boesen |
| 8,532,322 | B2 | 9/2013 | Parker |
| 8,842,870 | B2 | 9/2014 | East et al. |
| 8,886,263 | B2 | 11/2014 | Hosoi et al. |
| 8,918,149 | B2 | 12/2014 | Hosoi et al. |
| 9,020,168 | B2 | 4/2015 | Karkkainen |
| 9,020,170 | B2 | 4/2015 | Hosoi et al. |
| 9,107,466 | B2 | 8/2015 | Hoying |
| 9,313,306 | B2 | 4/2016 | Hosoi et al. |
| 9,351,090 | B2 | 5/2016 | Tachibana |
| 9,367,087 | B1 | 6/2016 | Townsend et al. |
| 9,471,102 | B2 | 10/2016 | Townsend et al. |
| 9,552,707 | B1 | 1/2017 | Bala |
| 9,565,285 | B2 | 2/2017 | Theverapperunna |
| 9,949,670 | B2 | 4/2018 | Ikeda |
| 10,016,161 | B2 | 7/2018 | Townsend et al. |
| 10,079,925 | B2 | 9/2018 | Hosoi |
| 10,356,231 | B2 | 7/2019 | Hosoi et al. |
| 10,699,691 | B1 * | 6/2020 | Ye .................... G10K 11/17881 |
| 10,728,649 | B1 * | 7/2020 | Holman ............... H04R 1/1091 |
| 11,166,094 | B2 * | 11/2021 | Li .................... H04R 1/026 |
| 2001/0011951 | A1 | 8/2001 | Kimata et al. |
| 2001/0025302 | A1 | 9/2001 | Suzuki et al. |
| 2001/0026626 | A1 | 10/2001 | Athanas |
| 2002/0001381 | A1 | 1/2002 | Mori |
| 2002/0003604 | A1 | 1/2002 | Yaguchi |
| 2002/0012441 | A1 | 1/2002 | Matsunaga et al. |
| 2002/0068995 | A1 | 6/2002 | Yoshida |
| 2002/0114214 | A1 | 8/2002 | Hansen et al. |
| 2002/0115478 | A1 | 8/2002 | Fujisawa et al. |
| 2002/0149561 | A1 | 10/2002 | Fukumoto et al. |
| 2002/0183014 | A1 | 12/2002 | Takeda et al. |
| 2003/0064758 | A1 | 4/2003 | Mizuta et al. |
| 2003/0083112 | A1 | 5/2003 | Fukuda |
| 2003/0108209 | A1 | 6/2003 | McIntosh |
| 2003/0118197 | A1 | 6/2003 | Nagayasu et al. |
| 2003/0119566 | A1 | 6/2003 | Chen |
| 2003/0174856 | A1 | 9/2003 | Johannsen et al. |
| 2004/0013279 | A1 | 1/2004 | Takeda |
| 2004/0048633 | A1 | 3/2004 | Sato et al. |
| 2004/0086149 | A1 | 5/2004 | Johannsen et al. |
| 2004/0087346 | A1 | 5/2004 | Johannsen et al. |
| 2004/0105566 | A1 | 6/2004 | Matsunaga et al. |
| 2004/0131211 | A1 | 7/2004 | Miyata et al. |
| 2004/0132509 | A1 | 7/2004 | Glezerman |
| 2004/0137963 | A1 | 7/2004 | Barras et al. |
| 2004/0189151 | A1 | 9/2004 | Athanas |
| 2004/0207542 | A1 | 10/2004 | Chang et al. |
| 2004/0259513 | A1 | 12/2004 | Park |
| 2005/0031152 | A1 | 2/2005 | Hansen et al. |
| 2005/0046790 | A1 | 3/2005 | Jannard et al. |
| 2005/0088530 | A1 | 4/2005 | Homma et al. |
| 2005/0129257 | A1 | 6/2005 | Tamura |
| 2005/0160270 | A1 | 7/2005 | Goldberg |
| 2005/0162936 | A1 | 7/2005 | Suzuki et al. |
| 2005/0162937 | A1 | 7/2005 | Suzuki et al. |
| 2005/0162938 | A1 | 7/2005 | Suzuki et al. |
| 2005/0162939 | A1 | 7/2005 | Suzuki et al. |
| 2005/0176459 | A1 | 8/2005 | Fukuda |
| 2005/0184875 | A1 | 8/2005 | Schmandt et al. |
| 2005/0185813 | A1 | 8/2005 | Sinclair et al. |
| 2005/0207599 | A1 | 9/2005 | Fukumoto et al. |
| 2005/0213432 | A1 | 9/2005 | Hoshuyama |
| 2005/0232436 | A1 | 10/2005 | Nagayasu et al. |
| 2005/0237685 | A1 | 10/2005 | Miyata |
| 2005/0244020 | A1 | 11/2005 | Nakajima et al. |
| 2005/0260969 | A1 | 11/2005 | Nagata et al. |
| 2005/0275714 | A1 | 12/2005 | Ishikawa et al. |
| 2005/0276164 | A1 | 12/2005 | Amron |
| 2005/0286734 | A1 | 12/2005 | Wang |
| 2006/0023158 | A1 * | 2/2006 | Howell .................... G02C 11/06 351/41 |
| 2006/0056649 | A1 | 3/2006 | Schumaier |
| 2006/0079291 | A1 | 4/2006 | Granovetter et al. |
| 2006/0089522 | A1 | 4/2006 | Rastatter et al. |
| 2006/0093161 | A1 | 5/2006 | Falcon |
| 2006/0094464 | A1 | 5/2006 | Kyou et al. |
| 2006/0113932 | A1 | 6/2006 | Mori et al. |
| 2006/0120546 | A1 | 6/2006 | Tanaka et al. |
| 2006/0121960 | A1 | 6/2006 | Wang |
| 2006/0140439 | A1 | 6/2006 | Nakagawa |
| 2006/0158064 | A1 | 7/2006 | Asakawa et al. |
| 2006/0159297 | A1 | 7/2006 | Wirola et al. |
| 2006/0171107 | A1 | 8/2006 | Yamamoto et al. |
| 2006/0215873 | A1 | 9/2006 | Hansen et al. |
| 2006/0216022 | A1 | 9/2006 | Lee et al. |
| 2006/0227984 | A1 | 10/2006 | Sinclair |
| 2006/0262951 | A1 | 11/2006 | Jun |
| 2006/0286998 | A1 | 12/2006 | Fukuda |
| 2007/0003098 | A1 | 1/2007 | Martenson |
| 2007/0014423 | A1 | 1/2007 | Darbut et al. |
| 2007/0015467 | A1 | 1/2007 | Nagayasu et al. |
| 2007/0019452 | A1 | 1/2007 | Ohkubo et al. |
| 2007/0025574 | A1 | 2/2007 | Azima et al. |
| 2007/0036370 | A1 | 2/2007 | Granovetter et al. |
| 2007/0053530 | A1 | 3/2007 | Ochiai et al. |
| 2007/0057601 | A1 | 3/2007 | Kawase et al. |
| 2007/0080951 | A1 | 4/2007 | Maruyama et al. |
| 2007/0081679 | A1 | 4/2007 | Suzuki et al. |
| 2007/0098200 | A1 | 5/2007 | Takei |
| 2007/0117594 | A1 | 5/2007 | Ong |
| 2007/0160238 | A1 | 7/2007 | Kobayashi |
| 2007/0160253 | A1 | 7/2007 | Takei et al. |
| 2007/0249395 | A1 | 10/2007 | Kondo et al. |
| 2007/0263893 | A1 | 11/2007 | Kim |
| 2007/0269777 | A1 | 11/2007 | Fux |
| 2007/0297637 | A1 | 12/2007 | Sugiyama |

(56) References Cited

U.S. PATENT DOCUMENTS

| | | |
|---|---|---|
| 2008/0008344 A1 | 1/2008 | Wakabayashi et al. |
| 2008/0054862 A1 | 3/2008 | Hara |
| 2008/0092278 A1 | 4/2008 | Rogers |
| 2008/0106449 A1 | 5/2008 | Doi |
| 2008/0107290 A1 | 5/2008 | Tamura |
| 2008/0107300 A1 | 5/2008 | Chen |
| 2008/0123893 A1 | 5/2008 | Lee |
| 2008/0129703 A1 | 6/2008 | Takeshita et al. |
| 2008/0137883 A1 | 6/2008 | Araki |
| 2008/0139254 A1 | 6/2008 | Levy |
| 2008/0140868 A1 | 6/2008 | Kalajian et al. |
| 2008/0143512 A1 | 6/2008 | Wakisaka et al. |
| 2008/0170725 A1 | 7/2008 | Asada et al. |
| 2008/0205679 A1 | 8/2008 | Darbut et al. |
| 2008/0227490 A1 | 9/2008 | Homma et al. |
| 2008/0227501 A1 | 9/2008 | Joo et al. |
| 2008/0239061 A1 | 10/2008 | Cok et al. |
| 2008/0240465 A1 | 10/2008 | Shiraishi |
| 2008/0247562 A1 | 10/2008 | Nagayasu et al. |
| 2008/0267433 A1 | 10/2008 | Katou et al. |
| 2008/0297373 A1 | 12/2008 | Hayakawa et al. |
| 2008/0319250 A1 | 12/2008 | Asnes |
| 2009/0002626 A1 | 1/2009 | Wakabayashi |
| 2009/0028356 A1 | 1/2009 | Ambrose et al. |
| 2009/0069045 A1 | 3/2009 | Cheng |
| 2009/0093283 A1 | 4/2009 | Mizuta et al. |
| 2009/0129620 A1 | 5/2009 | Tagawa et al. |
| 2009/0156186 A1 | 6/2009 | Lyle |
| 2009/0158423 A1 | 6/2009 | Orlassino |
| 2009/0184884 A1 | 7/2009 | Kyou et al. |
| 2009/0185699 A1 | 7/2009 | Kim |
| 2009/0226011 A1 | 9/2009 | Abolfathi et al. |
| 2009/0226017 A1 | 9/2009 | Abolfathi et al. |
| 2009/0226020 A1 | 9/2009 | Abolfathi et al. |
| 2009/0245556 A1 | 10/2009 | Parker et al. |
| 2009/0245557 A1 | 10/2009 | Parker |
| 2009/0288489 A1 | 11/2009 | Lee et al. |
| 2009/0290730 A1 | 11/2009 | Fukuda et al. |
| 2009/0304210 A1 | 12/2009 | Weisman |
| 2009/0323976 A1 | 12/2009 | Asada et al. |
| 2010/0056227 A1 | 3/2010 | Hayakawa et al. |
| 2010/0061582 A1 | 3/2010 | Takigawa et al. |
| 2010/0061584 A1 | 3/2010 | Lin et al. |
| 2010/0098269 A1 | 4/2010 | Abolfathi et al. |
| 2010/0150368 A1 | 6/2010 | Chang et al. |
| 2010/0172519 A1 | 7/2010 | Kimura et al. |
| 2010/0178597 A1 | 7/2010 | Ishida et al. |
| 2010/0178957 A1 | 7/2010 | Chen |
| 2010/0184487 A1 | 7/2010 | Takada |
| 2010/0216526 A1 | 8/2010 | Chen et al. |
| 2010/0222639 A1 | 9/2010 | Purcell |
| 2010/0238108 A1 | 9/2010 | Rekimoto |
| 2010/0245585 A1 | 9/2010 | Fisher |
| 2010/0246878 A1 | 9/2010 | Sim |
| 2010/0254562 A1 | 10/2010 | Koo |
| 2010/0310086 A1 | 12/2010 | Magrath et al. |
| 2010/0311462 A1 | 12/2010 | Endo et al. |
| 2010/0320961 A1 | 12/2010 | Castillo |
| 2010/0322127 A1 | 12/2010 | Nakajima |
| 2010/0328033 A1 | 12/2010 | Kamei |
| 2010/0329485 A1 | 12/2010 | Fukuda et al. |
| 2011/0028190 A1 | 2/2011 | Mizuta et al. |
| 2011/0028777 A1 | 2/2011 | Rastatter et al. |
| 2011/0034219 A1 | 2/2011 | Filson |
| 2011/0059769 A1 | 3/2011 | Brunolli |
| 2011/0143769 A1 | 6/2011 | Jones et al. |
| 2011/0143819 A1 | 6/2011 | Sugiyama et al. |
| 2011/0158425 A1 | 6/2011 | Hayakawa |
| 2011/0159855 A1 | 6/2011 | Cheng |
| 2011/0169622 A1 | 7/2011 | Billmaier |
| 2011/0170718 A1 | 7/2011 | Fukuda et al. |
| 2011/0180542 A1 | 7/2011 | Drollinger et al. |
| 2011/0201301 A1 | 8/2011 | Okada et al. |
| 2011/0224481 A1* | 9/2011 | Lee ................... G02C 11/06 600/25 |
| 2011/0237306 A1 | 9/2011 | Kamii |
| 2011/0254616 A1 | 10/2011 | Kawano |
| 2011/0263200 A1 | 10/2011 | Thornton et al. |
| 2011/0267551 A1 | 11/2011 | Yokote et al. |
| 2011/0280416 A1 | 11/2011 | Abolfathi et al. |
| 2011/0281617 A1 | 11/2011 | Kim et al. |
| 2011/0293105 A1 | 12/2011 | Arie et al. |
| 2011/0293133 A1 | 12/2011 | Yan |
| 2011/0299695 A1 | 12/2011 | Nicholson |
| 2011/0301729 A1 | 12/2011 | Heiman et al. |
| 2011/0316289 A1 | 12/2011 | Trimarche |
| 2011/0319016 A1 | 12/2011 | Gormley et al. |
| 2012/0008793 A1 | 1/2012 | Knox et al. |
| 2012/0008807 A1 | 1/2012 | Gran |
| 2012/0010735 A1 | 1/2012 | Gilboa |
| 2012/0020503 A1 | 1/2012 | Endo et al. |
| 2012/0028679 A1 | 2/2012 | Ozasa |
| 2012/0082329 A1 | 4/2012 | Neumeyer |
| 2012/0082335 A1 | 4/2012 | Duisters et al. |
| 2012/0105192 A1 | 5/2012 | Norieda |
| 2012/0130660 A1 | 5/2012 | Neumeyer |
| 2012/0133213 A1 | 5/2012 | Borke et al. |
| 2012/0139750 A1 | 6/2012 | Hayakawa et al. |
| 2012/0140917 A1 | 6/2012 | Nicholson et al. |
| 2012/0162143 A1 | 6/2012 | Kai et al. |
| 2012/0182429 A1 | 7/2012 | Forutanpour et al. |
| 2012/0183163 A1 | 7/2012 | Apfel |
| 2012/0219161 A1 | 8/2012 | Amada |
| 2012/0221329 A1 | 8/2012 | Harsch |
| 2012/0237075 A1 | 9/2012 | East et al. |
| 2012/0238908 A1 | 9/2012 | Osako et al. |
| 2012/0244917 A1 | 9/2012 | Hosoi et al. |
| 2012/0249223 A1 | 10/2012 | Neugebauer |
| 2012/0253236 A1 | 10/2012 | Snow |
| 2012/0283746 A1 | 11/2012 | Hu et al. |
| 2012/0289162 A1 | 11/2012 | Hosoi et al. |
| 2012/0298441 A1 | 11/2012 | Lin et al. |
| 2012/0300956 A1 | 11/2012 | Horii |
| 2012/0301859 A1 | 11/2012 | Rastatter et al. |
| 2012/0330654 A1 | 12/2012 | Angell |
| 2013/0039508 A1 | 2/2013 | Chen et al. |
| 2013/0051585 A1 | 2/2013 | Karkkainen |
| 2013/0100596 A1 | 4/2013 | Yokote et al. |
| 2013/0111346 A1 | 5/2013 | Little |
| 2013/0120311 A1 | 5/2013 | Ichikawa |
| 2013/0129121 A1 | 5/2013 | Yamashita |
| 2013/0133424 A1 | 5/2013 | Donaldson |
| 2013/0136279 A1 | 5/2013 | Brown |
| 2013/0142348 A1 | 6/2013 | Weisman |
| 2013/0169352 A1 | 7/2013 | Kawano |
| 2013/0169829 A1 | 7/2013 | Homma et al. |
| 2013/0177188 A1 | 7/2013 | Apfel |
| 2013/0180033 A1 | 7/2013 | Uemoto et al. |
| 2013/0191114 A1 | 7/2013 | Gim |
| 2013/0236043 A1 | 9/2013 | Abolfathi et al. |
| 2013/0242262 A1 | 9/2013 | Lewis |
| 2013/0242809 A1 | 9/2013 | Tone et al. |
| 2013/0252675 A1 | 9/2013 | Nicholson |
| 2013/0259221 A1 | 10/2013 | Shusaku et al. |
| 2013/0281152 A1 | 10/2013 | Nishimura |
| 2013/0293373 A1 | 11/2013 | Gegner et al. |
| 2013/0301860 A1 | 11/2013 | Neumeyer et al. |
| 2013/0308799 A1 | 11/2013 | Lin et al. |
| 2013/0316691 A1 | 11/2013 | Forutanpour et al. |
| 2013/0322670 A1 | 12/2013 | Hosoi et al. |
| 2013/0324193 A1 | 12/2013 | Hosoi et al. |
| 2013/0335210 A1 | 12/2013 | Arai et al. |
| 2013/0336507 A1 | 12/2013 | Gran |
| 2014/0003641 A1 | 1/2014 | Neumeyer et al. |
| 2014/0086417 A1 | 3/2014 | Hansen et al. |
| 2014/0087666 A1 | 3/2014 | Chen |
| 2014/0120834 A1 | 5/2014 | Gormley et al. |
| 2014/0205131 A1 | 6/2014 | Azmi et al. |
| 2014/0201889 A1 | 7/2014 | Pietrzak |
| 2014/0233356 A1 | 8/2014 | Pattikonda |
| 2014/0305714 A1 | 10/2014 | Huang |
| 2014/0313280 A1 | 10/2014 | Takuno et al. |
| 2014/0342783 A1 | 11/2014 | Suzuki et al. |
| 2014/0355792 A1 | 12/2014 | Nabata |

(56) References Cited

U.S. PATENT DOCUMENTS

| | | | |
|---|---|---|---|
| 2014/0378191 | A1 | 12/2014 | Hosoi et al. |
| 2015/0022438 | A1 | 1/2015 | Hong |
| 2015/0023527 | A1 | 1/2015 | Sato |
| 2015/0043748 | A1 | 2/2015 | Sudo |
| 2015/0043758 | A1 | 2/2015 | Yamada |
| 2015/0054779 | A1 | 2/2015 | Horii et al. |
| 2015/0065057 | A1 | 3/2015 | Hosoi et al. |
| 2015/0070083 | A1 | 3/2015 | Kawano |
| 2015/0071479 | A1 | 3/2015 | East et al. |
| 2015/0078569 | A1 | 3/2015 | Magrath et al. |
| 2015/0086047 | A1 | 3/2015 | Horii et al. |
| 2015/0094851 | A1 | 4/2015 | Kawabe et al. |
| 2015/0110318 | A1 | 4/2015 | Miyano |
| 2015/0110322 | A1 | 4/2015 | Andersson |
| 2015/0131816 | A1 | 5/2015 | Inagaki |
| 2015/0131838 | A1 | 5/2015 | Horii |
| 2015/0141088 | A1 | 5/2015 | Hosoi et al. |
| 2015/0156295 | A1 | 6/2015 | Kazama |
| 2015/0172588 | A1 | 6/2015 | Homma et al. |
| 2015/0180547 | A1 | 6/2015 | Gormley et al. |
| 2015/0181338 | A1 | 6/2015 | Hosoi et al. |
| 2015/0208153 | A1 | 7/2015 | Hosoi et al. |
| 2015/0256656 | A1 | 9/2015 | Horii |
| 2015/0256946 | A1 | 9/2015 | Neumeyer et al. |
| 2015/0289052 | A1 | 10/2015 | Takeda et al. |
| 2015/0320135 | A1 | 11/2015 | Lowe |
| 2016/0007109 | A1 | 1/2016 | Neumeyer et al. |
| 2016/0018892 | A1 | 1/2016 | Gu |
| 2016/0058091 | A1 | 3/2016 | Sasaki |
| 2016/0062392 | A1 | 3/2016 | Townsend et al. |
| 2016/0073202 | A1 | 3/2016 | Nabata et al. |
| 2016/0086594 | A1 | 3/2016 | Asada et al. |
| 2016/0100262 | A1 | 4/2016 | Inagaki |
| 2016/0150328 | A1 | 5/2016 | Inagaki |
| 2016/0205233 | A1 | 7/2016 | Hosoi et al. |
| 2016/0246076 | A1 | 8/2016 | Wei |
| 2016/0248894 | A1 | 8/2016 | Hosoi et al. |
| 2016/0261299 | A1 | 9/2016 | Hosoi et al. |
| 2016/0286296 | A1 | 9/2016 | Hosoi et al. |
| 2016/0337760 | A1 | 11/2016 | Suenaga |
| 2016/0349803 | A1 | 12/2016 | Dusan |
| 2017/0006144 | A1 | 1/2017 | Hosoi et al. |
| 2017/0013338 | A1 | 1/2017 | Wong |
| 2017/0026727 | A1 | 1/2017 | Hosoi et al. |
| 2017/0078464 | A1 | 3/2017 | Maruri et al. |
| 2017/0078788 | A1 | 3/2017 | Meyer et al. |
| 2017/0213452 | A1 | 7/2017 | Brunolli |
| 2017/0230754 | A1 | 8/2017 | Dusan |
| 2017/0295269 | A1 | 10/2017 | Hosoi |
| 2017/0302320 | A1 | 10/2017 | Hosoi et al. |
| 2017/0353797 | A1 | 12/2017 | Hosoi et al. |
| 2018/0124222 | A1 | 5/2018 | Hosoi et al. |
| 2018/0199127 | A1 | 7/2018 | Hosoi et al. |
| 2018/0206032 | A1 | 7/2018 | Meyer et al. |
| 2018/0262839 | A1 | 7/2018 | Hosoi et al. |
| 2018/0259915 | A1 | 9/2018 | Hosoi |
| 2018/0332152 | A1 | 11/2018 | Hosoi et al. |
| 2018/0352061 | A1 | 12/2018 | Hosoi et al. |
| 2019/0028580 | A1 | 1/2019 | Hosoi |
| 2020/0050269 | A1 | 2/2020 | Gu |
| 2020/0068308 | A1 | 2/2020 | Hosoi et al. |
| 2020/0142222 | A1* | 5/2020 | Belli ............... G02C 5/16 |
| 2020/0344542 | A1* | 10/2020 | Liu ................. G02C 11/06 |
| 2021/0011307 | A1* | 1/2021 | Huang .............. G02C 5/14 |

FOREIGN PATENT DOCUMENTS

| | | |
|---|---|---|
| CN | 1276142 | 12/2000 |
| CN | 1311942 | 9/2001 |
| CN | 1411253 | 4/2003 |
| CN | 2575916 | 9/2003 |
| CN | 1141856 | 3/2004 |
| CN | 1627864 | 6/2005 |
| CN | 2711766 | 7/2005 |
| CN | 1672114 | 9/2005 |
| CN | 1679371 | 10/2005 |
| CN | 1723733 | 1/2006 |
| CN | 1791283 | 6/2006 |
| CN | 1810062 | 7/2006 |
| CN | 2800681 | 7/2006 |
| CN | 1843019 | 10/2006 |
| CN | 1984505 | 6/2007 |
| CN | 101022678 | 8/2007 |
| CN | 201035260 | 3/2008 |
| CN | 101267463 | 9/2008 |
| CN | 101277331 | 10/2008 |
| CN | 101321196 | 12/2008 |
| CN | 101355823 | 1/2009 |
| CN | 101360140 | 2/2009 |
| CN | 101390438 | 3/2009 |
| CN | 101390440 | 3/2009 |
| CN | 201216023 | 4/2009 |
| CN | 100505768 | 6/2009 |
| CN | 101513081 | 8/2009 |
| CN | 101577764 | 11/2009 |
| CN | 101594161 | 12/2009 |
| CN | 100581276 | 1/2010 |
| CN | 101741952 | 6/2010 |
| CN | 101795143 | 8/2010 |
| CN | 101874410 | 10/2010 |
| CN | 101897198 | 11/2010 |
| CN | 101978704 | 2/2011 |
| CN | 102075633 | 5/2011 |
| CN | 201845183 | 5/2011 |
| CN | 102670206 | 9/2012 |
| CN | 202652216 | 1/2013 |
| CN | 102959930 | 3/2013 |
| CN | 103053147 | 4/2013 |
| CN | 203039851 | 7/2013 |
| CN | 103281953 | 9/2013 |
| CN | 203181220 | 9/2013 |
| CN | 103792682 | 5/2014 |
| CN | 103792683 | 5/2014 |
| CN | 103891308 | 6/2014 |
| CN | 103999480 | 8/2014 |
| CN | 108351524 | 7/2018 |
| EP | 1705875 | 3/2005 |
| EP | 1705075 | 9/2006 |
| EP | 1705874 | 9/2006 |
| EP | 1783919 | 5/2007 |
| EP | 1970792 | 9/2008 |
| EP | 2254345 | 11/2010 |
| EP | 2388981 | 11/2011 |
| EP | 2544430 | 1/2013 |
| JP | S57169312 U | 6/1905 |
| JP | S5194220 | 8/1976 |
| JP | S5236894 A | 3/1977 |
| JP | S55088497 | 7/1980 |
| JP | S5617780 | 2/1981 |
| JP | 2013061176 | 7/1981 |
| JP | S5690018 | 7/1981 |
| JP | S56089086 | 7/1981 |
| JP | S57162611 | 10/1982 |
| JP | U5650694 | 10/1982 |
| JP | 57179956 | 11/1982 |
| JP | S58182398 | 10/1983 |
| JP | S5984991 | 6/1984 |
| JP | S60116800 | 8/1985 |
| JP | S62208680 | 9/1987 |
| JP | S63115728 | 7/1988 |
| JP | 63142981 | 9/1988 |
| JP | S63140753 | 9/1988 |
| JP | H0212099 | 1/1990 |
| JP | H0262199 | 3/1990 |
| JP | 2182098 | 7/1990 |
| JP | H02-248121 | 10/1990 |
| JP | 329424 | 2/1991 |
| JP | H03117995 | 12/1991 |
| JP | 490298 | 3/1992 |
| JP | H04303815 | 10/1992 |
| JP | H0573073 | 3/1993 |
| JP | H0541297 | 6/1993 |
| JP | H05183618 | 7/1993 |
| JP | H05207579 | 8/1993 |

(56) References Cited

FOREIGN PATENT DOCUMENTS

| | | |
|---|---|---|
| JP | H05292167 | 11/1993 |
| JP | 06030494 | 2/1994 |
| JP | 3003950 | 8/1994 |
| JP | 3009206 | 1/1995 |
| JP | 07107146 | 4/1995 |
| JP | 07131268 | 5/1995 |
| JP | H7039150 | 7/1995 |
| JP | H07210176 | 8/1995 |
| JP | 08033026 | 2/1996 |
| JP | H879338 | 3/1996 |
| JP | 8102780 | 4/1996 |
| JP | H08090986 | 4/1996 |
| JP | H08111703 | 4/1996 |
| JP | 08237185 | 9/1996 |
| JP | H08256080 | 10/1996 |
| JP | H09023256 | 1/1997 |
| JP | H10042021 | 2/1998 |
| JP | 3050147 | 4/1998 |
| JP | 10136480 | 5/1998 |
| JP | H10200608 | 7/1998 |
| JP | 10227 U | 9/1998 |
| JP | H 1188973 | 3/1999 |
| JP | H11112672 | 4/1999 |
| JP | H11163980 | 6/1999 |
| JP | 3064055 | 9/1999 |
| JP | 11298595 | 10/1999 |
| JP | H11352138 | 12/1999 |
| JP | 2000013294 | 1/2000 |
| JP | 2000031858 | 1/2000 |
| JP | 3066305 | 2/2000 |
| JP | 200049935 | 2/2000 |
| JP | 3070222 | 4/2000 |
| JP | 2000217015 | 8/2000 |
| JP | 2000295696 | 10/2000 |
| JP | 2000322186 | 11/2000 |
| JP | 2000324217 | 11/2000 |
| JP | 2000339793 | 12/2000 |
| JP | 2001125742 | 5/2001 |
| JP | 2001169016 | 6/2001 |
| JP | 2001177809 | 6/2001 |
| JP | 2001215975 | 8/2001 |
| JP | 2001268211 | 9/2001 |
| JP | 2001287183 | 10/2001 |
| JP | 2001320790 | 11/2001 |
| JP | 2001333161 | 11/2001 |
| JP | 2001339504 | 12/2001 |
| JP | 2001352395 | 12/2001 |
| JP | 2002016720 | 1/2002 |
| JP | 2002023115 | 1/2002 |
| JP | 2002036158 | 2/2002 |
| JP | 2002041411 | 2/2002 |
| JP | 2002051111 | 2/2002 |
| JP | 200284575 | 3/2002 |
| JP | 2002111822 | 4/2002 |
| JP | 2002149312 | 5/2002 |
| JP | 2002164986 | 6/2002 |
| JP | 2002171321 | 6/2002 |
| JP | 2002223475 | 8/2002 |
| JP | 2002238262 | 8/2002 |
| JP | 2002262377 | 9/2002 |
| JP | 3090729 | 10/2002 |
| JP | 2002295696 | 10/2002 |
| JP | 2002359889 | 12/2002 |
| JP | 2002368839 | 12/2002 |
| JP | 2003032343 | 1/2003 |
| JP | 2003032768 | 1/2003 |
| JP | 2003037651 | 2/2003 |
| JP | 2003037885 | 2/2003 |
| JP | 2003101625 | 4/2003 |
| JP | 2003102094 | 4/2003 |
| JP | 2003103220 | 4/2003 |
| JP | 2003111175 | 4/2003 |
| JP | 2003125473 | 4/2003 |
| JP | 2003143253 | 5/2003 |
| JP | 2003145048 | 5/2003 |
| JP | 2003169115 | 6/2003 |
| JP | 2003173375 | 6/2003 |
| JP | 2003179988 | 6/2003 |
| JP | 2003198719 | 7/2003 |
| JP | 2003211087 | 7/2003 |
| JP | 2003218989 | 7/2003 |
| JP | 2003274376 | 9/2003 |
| JP | 2003274470 | 9/2003 |
| JP | 2003300015 | 10/2003 |
| JP | 2003304308 | 10/2003 |
| JP | 2003319022 | 11/2003 |
| JP | 2003348208 | 12/2003 |
| JP | 2004064457 | 2/2004 |
| JP | 2004094389 | 3/2004 |
| JP | 2004128915 | 4/2004 |
| JP | 2004157873 | 6/2004 |
| JP | 2004158961 | 6/2004 |
| JP | 2004166174 | 6/2004 |
| JP | 2004173018 | 6/2004 |
| JP | 2004173264 | 6/2004 |
| JP | 2004187031 | 7/2004 |
| JP | 2004190699 | 7/2004 |
| JP | 2004205839 | 7/2004 |
| JP | 2004208220 | 7/2004 |
| JP | 2004229179 | 8/2004 |
| JP | 2004233316 | 8/2004 |
| JP | 2004252626 | 9/2004 |
| JP | 2004266321 | 9/2004 |
| JP | 2004274438 | 9/2004 |
| JP | 2004357198 | 12/2004 |
| JP | 2005020234 | 1/2005 |
| JP | 2005020730 | 1/2005 |
| JP | 2005072643 | 3/2005 |
| JP | 2005074257 | 3/2005 |
| JP | 2005311125 | 4/2005 |
| JP | 2005512440 | 4/2005 |
| JP | 2005142729 | 6/2005 |
| JP | 2005142835 | 6/2005 |
| JP | 2005151292 | 6/2005 |
| JP | 2005159969 | 6/2005 |
| JP | 2005184267 | 7/2005 |
| JP | 2005/229324 | 8/2005 |
| JP | 2005223717 | 8/2005 |
| JP | 2005237026 | 9/2005 |
| JP | 2005244968 | 9/2005 |
| JP | 2005328125 | 11/2005 |
| JP | 2005534269 | 11/2005 |
| JP | 2005340927 | 12/2005 |
| JP | 2005341543 | 12/2005 |
| JP | 2005348193 | 12/2005 |
| JP | 2005352024 | 12/2005 |
| JP | 2006005625 | 1/2006 |
| JP | 2006007342 | 1/2006 |
| JP | 2006007919 | 1/2006 |
| JP | 2006011591 | 1/2006 |
| JP | 2006019812 | 1/2006 |
| JP | 2006050056 | 2/2006 |
| JP | 2006051300 | 2/2006 |
| JP | 2006066972 | 3/2006 |
| JP | 2006067049 | 3/2006 |
| JP | 2006074671 | 3/2006 |
| JP | 2006086581 | 3/2006 |
| JP | 2006094158 | 4/2006 |
| JP | 2006109326 | 4/2006 |
| JP | 2006115060 | 4/2006 |
| JP | 2006115476 | 4/2006 |
| JP | 2006129117 | 5/2006 |
| JP | 2006129404 | 5/2006 |
| JP | 2006148295 | 6/2006 |
| JP | 2006155734 | 6/2006 |
| JP | 2006157226 | 6/2006 |
| JP | 2006157318 | 6/2006 |
| JP | 2006165702 | 6/2006 |
| JP | 2006166128 | 6/2006 |
| JP | 2006166300 | 6/2006 |
| JP | 2006186691 | 7/2006 |
| JP | 2006197267 | 7/2006 |
| JP | 2006197404 | 7/2006 |
| JP | 2006211317 | 8/2006 |

(56) References Cited

FOREIGN PATENT DOCUMENTS

| | | |
|---|---|---|
| JP | 2006217088 | 8/2006 |
| JP | 2006217321 | 8/2006 |
| JP | 2006226506 | 8/2006 |
| JP | 2006229647 | 8/2006 |
| JP | 2006238072 | 9/2006 |
| JP | 2006283541 | 10/2006 |
| JP | 2006295786 | 10/2006 |
| JP | 2006303618 | 11/2006 |
| JP | 2006333058 | 12/2006 |
| JP | 2006339914 | 12/2006 |
| JP | 2006345025 | 12/2006 |
| JP | 2006345471 | 12/2006 |
| JP | 2007003702 | 1/2007 |
| JP | 2007006369 | 1/2007 |
| JP | 2007010518 | 1/2007 |
| JP | 2007019898 | 1/2007 |
| JP | 2007019957 | 1/2007 |
| JP | 2007020051 | 1/2007 |
| JP | 2007028469 | 2/2007 |
| JP | 2007051007 | 3/2007 |
| JP | 2007051395 | 3/2007 |
| JP | 2007072015 | 3/2007 |
| JP | 2007074663 | 3/2007 |
| JP | 2007081276 | 3/2007 |
| JP | 2007505540 | 3/2007 |
| JP | 2007096386 | 4/2007 |
| JP | 2007103989 | 4/2007 |
| JP | 2007104548 | 4/2007 |
| JP | 2007104603 | 4/2007 |
| JP | 2007129740 | 5/2007 |
| JP | 2007133698 | 5/2007 |
| JP | 2007142920 | 6/2007 |
| JP | 2007165938 | 6/2007 |
| JP | 2007180827 | 7/2007 |
| JP | 2007189578 | 7/2007 |
| JP | 2007195239 | 8/2007 |
| JP | 2007214883 | 8/2007 |
| JP | 2007228508 | 9/2007 |
| JP | 2007268028 | 10/2007 |
| JP | 2007275819 | 10/2007 |
| JP | 2007281916 | 10/2007 |
| JP | 2007306465 | 11/2007 |
| JP | 2007307124 | 11/2007 |
| JP | 2007330560 | 12/2007 |
| JP | 2007336418 | 12/2007 |
| JP | 2008000709 | 1/2008 |
| JP | 2008006558 | 1/2008 |
| JP | 2008017327 | 1/2008 |
| JP | 2008017398 | 1/2008 |
| JP | 2008042324 | 2/2008 |
| JP | 2008046844 | 2/2008 |
| JP | 2008085417 | 4/2008 |
| JP | 2008092164 | 4/2008 |
| JP | 2008092313 | 4/2008 |
| JP | 2008511217 | 4/2008 |
| JP | 2008121796 | 5/2008 |
| JP | 2008514053 | 5/2008 |
| JP | 2008135991 | 6/2008 |
| JP | 2008141589 | 6/2008 |
| JP | 2008141687 | 6/2008 |
| JP | 2008148086 | 6/2008 |
| JP | 2008149427 | 7/2008 |
| JP | 2008153783 | 7/2008 |
| JP | 2008177629 | 7/2008 |
| JP | 2008177705 | 7/2008 |
| JP | 3144392 | 8/2008 |
| JP | 2008227123 | 9/2008 |
| JP | 2008227806 | 9/2008 |
| JP | 2008229531 | 10/2008 |
| JP | 2008263383 | 10/2008 |
| JP | 2008301071 | 12/2008 |
| JP | 2009010593 | 1/2009 |
| JP | 2009044510 | 2/2009 |
| JP | 2009077260 | 4/2009 |
| JP | 2009088942 | 4/2009 |
| JP | 2009094986 | 4/2009 |
| JP | 200922261 | 5/2009 |
| JP | 2009111820 | 5/2009 |
| JP | 2009117953 | 5/2009 |
| JP | 2009118396 | 5/2009 |
| JP | 2009147680 | 7/2009 |
| JP | 2009159577 | 7/2009 |
| JP | 2009166213 | 7/2009 |
| JP | 2009171249 | 7/2009 |
| JP | 4307488 | 8/2009 |
| JP | 2009207056 | 10/2009 |
| JP | 2009232443 | 10/2009 |
| JP | 2009246954 | 10/2009 |
| JP | 2009260883 | 11/2009 |
| JP | 2009267616 | 11/2009 |
| JP | 2009542038 | 11/2009 |
| JP | 2010010945 | 1/2010 |
| JP | 2010011117 | 1/2010 |
| JP | 2010054731 | 3/2010 |
| JP | 2010068299 | 3/2010 |
| JP | 2010087810 | 4/2010 |
| JP | 2010094799 | 4/2010 |
| JP | 2010109795 | 5/2010 |
| JP | 2010124287 | 6/2010 |
| JP | 4541111 | 7/2010 |
| JP | 2010147727 | 7/2010 |
| JP | 2010166406 | 7/2010 |
| JP | 2010524295 | 7/2010 |
| JP | 2010528547 | 8/2010 |
| JP | 2010207963 | 9/2010 |
| JP | 2010232755 | 10/2010 |
| JP | 2010245854 | 10/2010 |
| JP | 2010258701 | 11/2010 |
| JP | 2010268336 | 11/2010 |
| JP | 2010283541 | 12/2010 |
| JP | 2011004195 | 1/2011 |
| JP | 2011008503 | 1/2011 |
| JP | 2011010791 | 1/2011 |
| JP | 2011015193 | 1/2011 |
| JP | 2011017969 | 1/2011 |
| JP | 2011035560 | 2/2011 |
| JP | 2011048697 | 3/2011 |
| JP | 2011053744 | 3/2011 |
| JP | 2011059376 | 3/2011 |
| JP | 2011087142 | 4/2011 |
| JP | 2011512745 | 4/2011 |
| JP | 2011114454 | 6/2011 |
| JP | 2011130334 | 6/2011 |
| JP | 2011135489 | 7/2011 |
| JP | 2011139439 | 7/2011 |
| JP | 2011139462 | 7/2011 |
| JP | 2011160175 | 8/2011 |
| JP | 2011212167 | 10/2011 |
| JP | 2011223556 | 11/2011 |
| JP | 2011223824 | 11/2011 |
| JP | 2011233971 | 11/2011 |
| JP | 2011234323 | 11/2011 |
| JP | 2012028852 | 2/2012 |
| JP | 2012034064 | 2/2012 |
| JP | 2012070245 | 4/2012 |
| JP | 2012508499 | 4/2012 |
| JP | 2012109663 | 6/2012 |
| JP | 2012138770 | 7/2012 |
| JP | 2012142679 | 7/2012 |
| JP | 2012515574 | 7/2012 |
| JP | 2012150266 | 8/2012 |
| JP | 2012156781 | 8/2012 |
| JP | 2012169817 | 9/2012 |
| JP | 2012178695 | 9/2012 |
| JP | 2012186684 | 9/2012 |
| JP | 5108161 | 10/2012 |
| JP | 2012191244 | 10/2012 |
| JP | 2012196455 | 10/2012 |
| JP | 2012244515 | 12/2012 |
| JP | 2012249097 | 12/2012 |
| JP | 2012257049 | 12/2012 |
| JP | 2012257072 | 12/2012 |
| JP | 2013005212 | 1/2013 |
| JP | 3181807 | 2/2013 |

(56) References Cited

FOREIGN PATENT DOCUMENTS

| | | |
|---|---|---|
| JP | 2013055492 | 3/2013 |
| JP | 5246695 | 4/2013 |
| JP | 2013078116 | 4/2013 |
| JP | 2013514737 | 4/2013 |
| JP | 2013081047 | 5/2013 |
| JP | 2013105272 | 5/2013 |
| JP | 2013115638 | 6/2013 |
| JP | 2013115800 | 6/2013 |
| JP | 2013128896 | 7/2013 |
| JP | 2013130402 | 7/2013 |
| JP | 2013162167 | 8/2013 |
| JP | 2013198072 | 9/2013 |
| JP | 2013201560 | 10/2013 |
| JP | 2013232860 | 11/2013 |
| JP | 2013235316 | 11/2013 |
| JP | 2013236396 | 11/2013 |
| JP | 2013255091 | 12/2013 |
| JP | 2013255212 | 12/2013 |
| JP | 2014003488 | 1/2014 |
| JP | 2014068346 | 4/2014 |
| JP | 2014089494 | 5/2014 |
| JP | 2014116755 | 6/2014 |
| JP | 2014116972 | 6/2014 |
| JP | 3193583 | 9/2014 |
| JP | 2014165692 | 9/2014 |
| JP | 2014190965 | 10/2014 |
| JP | 2014216861 | 11/2014 |
| JP | 2014229991 | 12/2014 |
| JP | 2014232905 | 12/2014 |
| JP | 5676003 | 2/2015 |
| JP | 2015053640 | 3/2015 |
| JP | 2015061285 | 3/2015 |
| JP | 2015066623 | 4/2015 |
| JP | 2015082818 | 4/2015 |
| JP | 2015084801 | 5/2015 |
| JP | 2015089016 | 5/2015 |
| JP | 2015139132 | 7/2015 |
| JP | 3200747 | 10/2015 |
| JP | 2015222908 | 12/2015 |
| JP | 2016063276 | 4/2016 |
| JP | 2018064237 | 4/2018 |
| JP | 3222399 | 8/2019 |
| JP | 2003188985 | 7/2022 |
| JP | 2009159402 | 7/2022 |
| KR | 970008927 | 5/1997 |
| KR | 1019980022845 | 6/1998 |
| KR | 200389666 | 7/2005 |
| KR | 1020050086378 | 8/2005 |
| KR | 20060121606 | 11/2006 |
| KR | 1020070109323 | 11/2007 |
| KR | 1020080006514 | 1/2008 |
| KR | 1020080009602 | 1/2008 |
| KR | 1020080040962 | 5/2008 |
| KR | 1020090033564 | 4/2009 |
| KR | 1020090082879 | 7/2009 |
| KR | 1020090120951 | 11/2009 |
| KR | 1020100034906 | 4/2010 |
| KR | 1020100041386 | 4/2010 |
| KR | 20110006838 | 1/2011 |
| KR | 20110121012 | 11/2011 |
| KR | 20120015209 | 2/2012 |
| KR | 101358881 | 2/2014 |
| KR | 20150010087 | 1/2015 |
| KR | 20160003340 | 1/2016 |
| KR | 102017755 | 9/2019 |
| TW | 200423682 | 11/2004 |
| TW | 200536415 | 11/2005 |
| TW | 200539664 | 12/2005 |
| TW | 200601866 | 1/2006 |
| TW | 200605621 | 2/2006 |
| TW | 1353164 B | 3/2009 |
| TW | 200912814 | 3/2009 |
| TW | 201018982 | 5/2010 |
| TW | 201119339 | 6/2011 |
| TW | I391880 | 11/2011 |
| TW | 201233119 | 8/2012 |
| TW | M452360 U | 5/2013 |
| TW | 201332333 | 8/2013 |
| TW | 201342313 | 10/2013 |
| TW | 201513629 | 4/2015 |
| WO | WO 199627253 | 9/1996 |
| WO | WO199805148 | 2/1998 |
| WO | WO2001087007 | 11/2001 |
| WO | WO2003055183 | 7/2003 |
| WO | WO2004034734 | 4/2004 |
| WO | WO2005067339 | 7/2005 |
| WO | WO2005069586 | 7/2005 |
| WO | WO2005086522 | 9/2005 |
| WO | WO2005091670 | 9/2005 |
| WO | WO2005096599 | 10/2005 |
| WO | WO2005096664 | 10/2005 |
| WO | WO2006006313 | 1/2006 |
| WO | WO2006021133 | 3/2006 |
| WO | WO2006028045 | 3/2006 |
| WO | WO2006075440 | 7/2006 |
| WO | WO2006080517 | 8/2006 |
| WO | WO2007034739 | 3/2007 |
| WO | WO2007046269 | 4/2007 |
| WO | WO2007099707 | 9/2007 |
| WO | WO2008007666 | 1/2008 |
| WO | WO2008029515 | 3/2008 |
| WO | WO2008145949 | 12/2008 |
| WO | WO2009104437 | 8/2009 |
| WO | WO2009105115 | 8/2009 |
| WO | WO2009116272 | 9/2009 |
| WO | WO2009133873 | 11/2009 |
| WO | WO2009136498 | 11/2009 |
| WO | WO2009141912 | 11/2009 |
| WO | WO2010005045 | 1/2010 |
| WO | WO2010050154 | 5/2010 |
| WO | WO2010060323 | 6/2010 |
| WO | WO2010116510 | 10/2010 |
| WO | WO2010140087 | 12/2010 |
| WO | WO2011007679 | 1/2011 |
| WO | WO2011023672 | 3/2011 |
| WO | WO2011090944 | 7/2011 |
| WO | WO2011121740 | 10/2011 |
| WO | WO2011153165 | 12/2011 |
| WO | WO2011159349 | 12/2011 |
| WO | WO2002021881 | 3/2012 |
| WO | WO2012090944 | 7/2012 |
| WO | WO2012090947 | 7/2012 |
| WO | WO2012097314 | 7/2012 |
| WO | WO2012114772 | 8/2012 |
| WO | WO2012114917 | 8/2012 |
| WO | WO2013047609 | 4/2013 |
| WO | WO2013108426 | 7/2013 |
| WO | WO2013121631 | 8/2013 |
| WO | WO2013168628 | 11/2013 |
| WO | WO2014003160 | 1/2014 |
| WO | WO2014156534 | 10/2014 |
| WO | WO2015064340 | 5/2015 |
| WO | WO2015122879 | 8/2015 |
| WO | WO2015187092 | 12/2015 |
| WO | WO2015033677 | 3/2017 |
| WO | WO2017099938 | 6/2017 |

OTHER PUBLICATIONS

International Search Report and Written Opinion in PCT Application No. PCT/JP2019/037808, dated Nov. 12, 2019, 10 pages (with partial translation).

Japanese Patent Office, Office Action in Japanese Application No. 2019-160729, 7 pages, dated Dec. 22, 2020 (with English Translation).

JP Office Action in Japanese Application No. 2019-228501, dated Apr. 6, 2021, 4 pages (with English Translation).

Japanese Patent Office, Office Action in Japanese Appln. No. 2020-173987, 9 pages, dated Aug. 3, 2021, (with English Translation).

China Intellectual Property Office, Office Action for China Appln. No. 201510131342.1, dated Nov. 4, 2019, with English Translation, 21 pages.

(56) References Cited

OTHER PUBLICATIONS

Chinese Office Action in Chinese Application No. 201280070726.1, dated May 12, 2017, 12 pages (with English Translation).
Chinese Office Action in Chinese Application No. 201510148247.2, dated May 3, 2017, 39 pages (English Translation).
Chinese Office Action in Chinese Application No. 201510430884.9, dated Jul. 3, 2017, 12 pages (with English Translation).
CN Office Action in Chinese Application No. 201680041763.8, dated Apr. 3, 2020, 18 pages (with English translation).
CN Office Action in Chinese Application No. 201810260704, dated Dec. 2, 2020, 7 pages.
CN Office Action in Chinese Application No. 201810260704, dated Jul. 1, 2020, 12 pages (with English translation).
English machine translation of JP 2007-103989 (Akiko Takashinna, Receiver, published Apr. 2007.
EP Search Report in European Application No. 20166767.2, dated Jun. 29, 2020, 12 pages.
European Extended Search Report for EP Application No. 18179998.2 dated Oct. 26, 2018, 18 pages.
European Patent Office, EESR for EP Application No. 16824527.2 dated Feb. 28, 2019, 5 pages.
European Patent Office, EESR for European Patent Application No. 15834516 dated Mar. 12, 2018, 6 pages.
European Patent Office, official communication in Application No. EP 11 85 3718, dated May 14, 2014, 14 pages.
European Patent Office, Partial Search Report for EP 11 85 3443 dated Oct. 27, 2016, 8 pages.
European Patent Office, Summons to attend oral proceedings for EP Appln. No. 11853443.7, mailed Oct. 10, 2019, 25 pages.
European Patent Office. EESR for EP Application No. 16846372.7 dated Feb. 19, 2019, 7 pages.
Extended European Search Report for PCTJP2013067781 dated Feb. 19, 2016, 7 pages.
Extended European Search Report in European patent application No. 12866397.8 dated Jul. 20, 2015, 6 pages.
Final Office Action for JP Patent Application No. 2012-120173 dated Feb. 7, 2017 with English translation, 6 pages.
Fukumoto, M. and Sugimura, T., Fulltime-wear Interface Technology , NTT Technical Review, 8(1):77-81, (2003) (with English Translation).
International Search Report and Written Opinion in PCT Application No. PCT/JP2019/037808, dated Nov. 12, 2019, 12 pages.
International Search Report for International Application No. PCT/JP2016/070848, dated Sep. 9, 2016, 5 pages.
International Search Report for International Application No. PCT/JP2017/000787, dated Mar. 28, 2017, 1 page.
International Search Report for International Patent Application PCT/JP2011/080099 (dated Apr. 3, 2012), 21 pages.
Isaka et al., "Development of Bone Conduction Speaker by Using Piezoelectric Vibration," The Japan Society of Mechanical Engineers (No. 04-5) Dynamics and Design Conference 2004 CD-ROM Compilation (Sep. 27-30, 2004; Tokyo) (and English translation).
Japan Patent Office, International Search Report for PCT/JP2014/077792 dated Dec. 16, 2014 (with English translation), 16 pages.
Japan Patent Office, International Search Report for PCT/JP2015/071490 dated Nov. 2, 2015 with English translation, 17 pages.
Japan Patent Office, International Search Report for PCT/JP2016/076494 dated Nov. 29, 2016, with English translation, 5 pages.
Japan Patent Office, JP Application No. 2015-082557 dated Mar. 19, 2019 with English translation, 18 pages.
Japan Patent Office, Office Action for Japanese Patent Application No. 2013-106416 dated Jan. 9, 2018 with English translation, 5 pages.
Japan Patent Office, Office Action for Japanese Patent Application No. 2016-202733 dated Mar. 13, 2018 with English translation, 6 pages.
Japan Patent Office, Office Action for JP 2015-082557 dated Jul. 30, 2019 with English Translation, 6 pages.
Japan Patent Office, Office Action for JP 2015-141168, dated Jun. 4, 2019 with English Translation, 14 pages.
Japan Patent Office, Office Action for JP 2015-238764 dated Aug. 20, 2019 with English Translation, 9 pages.
Japan Patent Office, Office Action for JP Application No. 2014-256091 dated Oct. 30, 2018 with English translation, 7 pages.
Japan Patent Office, Office Action for JP2015-204396, dated Jul. 16, 2019 with English Translation, 6 pages.
Japan Patent Office, Office Action dated Oct. 23, 2018 for Japanese Application No. 2015-012282 with English translation, 6 pages.
Japanese Office Action in Japanese Application No. 2012-150941, dated May 9, 2017, English Translation.
Japanese Office Action in Japanese Application No. 2012-197484, dated Jun. 13, 2017, English Translation, 6 pages.
Japanese Office Action in Japanese Application No. 2013-028997, dated Mar. 21, 2017, 8 pages (English Translation), 8 pages.
Japanese Office Action in Japanese Application No. 2013-106416, dated May 30, 2017, English Translation, 7 pages.
Japanese Office Action in Japanese Application No. 2013-126623, dated Jun. 13, 2017, English Translation, 6 pages.
Japanese Office Action in Japanese Application No. 2015-217421, dated Feb. 28, 2017, 6 pages (English Translation).
Japanese Office Action in Japanese Application No. 2016-051347, dated Feb. 14, 2017, 6 pages (English Translation).
Japanese Office Action in Japanese Application No. 2016-087027, dated Mar. 28, 2017, 9 pages (English Translation).
Japanese Office Action in Japanese Application No. 2016-097777, dated Mar. 21, 2017, 8 pages (English Translation), 8 pages.
Japanese Office Action in Japanese Application No. 2016-114221, dated Jun. 13, 2017, English Translation, 6 pages.
Japanese Patent Office, International Search Report for International Patent Application PCT/JP2012/053231 (dated Mar. 13, 2012), 18 pages.
Japanese Patent Office, International Search Report for International Patent Application PCT/JP2012/066376 (dated Oct. 30, 2012), 9 pages.
Japanese Patent Office, International Search Report for PCT/JP2013/067781 dated Oct. 1, 2013 (with English translation), 8 pages.
Japanese Patent Office, International Search Report for PCT/JP2014/071607 dated Nov. 11, 2014 (with English translation), 10 pages.
Japanese Patent Office, official communication in Japanese Patent Application No. 2012-054308 dated Jun. 7, 2016 (and machine translation), 6 pages.
Japanese Patent Office, official communication in Japanese Patent Application No. 2012-120173 dated Jul. 26, 2016 (and machine translation), 6 pages.
Japanese Patent Office, official communication in Japanese Patent Application No. 2012-147753 dated Aug. 23, 2016 (and machine translation), 9 pages.
Japanese Patent Office, official communication in Japanese Patent Application No. 2015-048052 dated Aug. 2, 2016 (and machine translation), 8 pages.
Japanese Patent Office, official communication in Japanese Patent Application No. 2015-056466 dated Jul. 12, 2016 (and machine translation), 6 pages.
Japanese Patent Office, official communication in Japanese Patent Application No. 2015-217421 dated Jul. 19, 2016 (and machine translation), 6 pages.
Japanese Patent Office, official communication in Japanese Patent Application No. 2015-217427 dated Jul. 19, 2016 (and machine translation), 7 pages.
Japanese Patent Office, official communication in Japanese Patent Application No. 2015-231478 dated Aug. 30, 2016 (and machine translation), 8 pages.
JP Office Action in Japanese Application No. 2019-160729, dated Oct. 13, 2020, 16 pages (with English translation).
JP Office Action in Japanese Application No. 2019-228501, dated Sep. 29, 2020, 8 pages (with English translation).
Korea Intellectual Property Office, Office Action for Korean Application No. 10-2019-7025296, dated Sep. 20, 2019, with English Translation, 9 pages.
Korea Intellectual Property Office, Office Action for Korean Appln No. 10-2018-7020853, dated Sep. 16, 2019, with English Translation, 7 pages.

(56) References Cited

OTHER PUBLICATIONS

Korea Intellectual Property Office, Office Action for Korean Appln No. 10-2019-7011539, dated Dec. 25, 2019, 10 pages (with English translation).
Korean Intellectual Property Office, Office Action for counterpart KR Application No. 10-2017-7016517 dated Oct. 31, 2018 with English translation, 14 pages.
Korean Intellectual Property Office, Office Action for Korean Application No. 10-2018-7006763 dated Jan. 30, 2019 with English Translation, 13 pages.
Korean Intellectual Property Office, Office Action for Korean Application No. 10-2018-7014722 dated Dec. 26, 2018 with English Translation, 9 pages.
Korean Intellectual Property Office, Office Action for Korean Application No. 10-2018-7034989 dated Mar. 4, 2019 with English Translation, 12 pages.
Korean Intellectual Property Office, Office Action for KR10-2019-7011539 dated Jun. 20, 2019 with English Translation, 5 pages.
Korean Office Action in Korean Application No. 10-2015-7005518, dated Mar. 20, 2017, 12 pages (English Translation).
News Release, "New Offer of Smartphone Using Cartilage Conduction", Rohm Semiconductor, Kyoto, Japan, Apr. 23, 2012 (with English translation).
Office Action for Japanese Patent Application No. 2013-186424 dated Sep. 26, 2017, with English translation, 8 pages.
Office Action for Japanese Patent Application No. 2013-195756 dated Sep. 26, 2017, with English translation, 12 pages.
Office Action for Japanese Application No. 2017-004233 dated Nov. 21, 2017 with English Translation, 6 pages.
Office Action for Japanese Patent Application No. 2013-173595 dated Oct. 10, 2017 (with English translation), 10 pages.
Office Action for Japanese Patent Application No. 2013-221303 dated Dec. 26, 2017 with English Translation, 8 pages.
Office Action for Japanese Patent Application No. 2013-221303 dated Oct. 17, 2017 with English Translation, 10 pages.
Office Action for Japanese Patent Application No. 2013-237963 dated Dec. 26, 2017 with English Translation, 7 pages.
Office Action for Japanese Patent Application No. 2013-237963 dated Nov. 7, 2017 with English Translation, 7 pages.
Office Action for Japanese Patent Application No. 2014-010271 dated Nov. 28, 2017 with English Translation, 10 pages.
Office Action for Japanese Patent Application No. 2016-185559 dated Jul. 25, 2017 with English translation, 6 pages.
Office Action for Japanese Patent Application No. 2016-195560 dated Aug. 22, 2017 with English translation, 8 pages.
Office Action for Japanese Patent Application No. 2016-197219 dated Aug. 22, 2017, with English translation, 7 pages.
Office Action for Japanese Patent Application No. 2016-197225 dated Aug. 22, 2017 with English translation, 6 pages.
Office Action for Japanese Patent Application No. 2016-236604 dated Nov. 21, 2017 with English Translation, 5 pages.
Office Action for Japanese Patent Application No. 2017-000580 dated Dec. 19, 2017 with English Translation, 10 pages.
Office Action for JP Patent Application No. 2012-054308 dated Feb. 7, 2017 with English Translation, 6 pages.
Office Action for JP Patent Application No. 2012-229176 dated Dec. 27, 2016 with English Translation, 8 pages.
Office Action for JP Patent Application No. 2012-243480 dated Dec. 20, 2016 with English Translation, 9 pages.
Office Action for JP Patent Application No. 2012-252203 dated Dec. 20, 2016 with English Translation, 6 pages.
Office Action for JP Patent Application No. 2012-268649 dated Jan. 31, 2017 with English Translation, 6 pages.
Office Action for JP Patent Application No. 2016-013411 dated Nov. 22, 2016 with English Translation, 7 pages.
Office Action for Korean Application No. 10-2016-7004740 dated Dec. 19, 2017 with English Translation, 6 pages.
Office Action for KR Patent Application No. 10-2016-7004740 dated Nov. 28, 2016 with English Translation, 12 pages.
Office Action in Chinese Appln. No. 201810640135.2, dated Jan. 21, 2020, 14 pages (with English translation).
Office Action in Japanese Appln. No. 2016-120820, dated Jan. 21, 2020, 6 pages (with English translation).
Office Action in Japanese Appln. No. 2016-202836, dated Mar. 24, 2020, 8 pages (with English translation).
Office Action mailed for Japanese Patent Application No. 2013-227279 dated Oct. 17, 2017 with English translation, 8 pages.
Office Action mailed for KR Patent Application No. 10-2017-7019074 dated Oct. 13, 2017 with English Translation, 9 pages.
Rion Co. Ltd., "New-generation Vibration Level Meter Model VM-51," Acoustical Society of Japan, 1990 with Partial English Translation.
Sasaki C, Crusoe Supplementary Class note Which Condensed the Function Called for, ASCII, 12 pages (2001) (Partial English Translation).
Shimomura et al., "Vibration and Acoustic Characteristics of Cartilage Transducer," Acoustical Society of Japan, 2010 with Partial English Translation.
SIPO of People's Republic of China, official communication for Chinese Patent Application No. 201180031904.5 dated Jul. 20, 2016 (and machine translation), 19 pages.
SIPO Patent Office, Chinese Patent Application No. 2014800584218 dated Jan. 3, 2018, with English translation, 29 pages.
SIPO, Office Action for Chinese Application No. 201610520280.8 dated Jan. 3, 2019 with English Translation, 14 pages.
SIPO, Office Action dated Aug. 8, 2018 for Chinese application No. 201580044713.0 with English translation, 18 pages.
Smartphone Black Berry Bold 9700, Operation guide (2010), 9 pages.
Taiwanese Patent Office, search report in application 100148983 (2 pages) (dated Jan. 17, 2013).
TW Office Action in Taiwanese Application No. 10920470180, dated May 20, 2020, 6 pages.
TW Office Action in Taiwanese Application No. 10920697260, dated Jul. 23, 2020, 4 pages.

* cited by examiner

HEARING DEVICE

TECHNICAL FIELD

The invention disclosed herein relates to hearing devices.

BACKGROUND ART

The present applicant has been proposing a number of hearing devices employing cartilage Conduction® as well as cellular telephones, hearing aids, and the like employing such hearing devices (see. e.g., Patent Document 1 identified below).

CITATION LIST

Patent Literature

Patent Document 1: Japanese unexamined patent application publication No. 2018-064237.

SUMMARY OF INVENTION

Technical Problem

Known hearing devices, however, leave room for further improvement in terms of user-friendliness.

In view of the above-mentioned problem encountered by the present inventors, an object of the invention disclosed herein is to provide a hearing device that is user-friendly.

Solution to Problem

According to one aspect of what is disclosed herein, a hearing device includes a vibrator that is configured to conduct vibration according to an audio signal to the nasal bone of a user, so that the hearing device enables the user to hear sound. (A first configuration.)

The hearing device according to the first configuration described above may further include a body that is in the form of eyeglasses and that is configured to hold the vibrator at a position where a nose pad is supposed to be provided. (A second configuration.)

The hearing device according to the first or second configuration described above may incorporate an audio signal receiver that is configured to receive, on a wireless or wired basis, the audio signal generated by a sound source outside the hearing device. (A third configuration.)

The hearing device according to the first or second configuration described above may incorporate a sound source that is configured to generate the audio signal. (A fourth configuration.)

In the hearing device according to the third or fourth configuration described above, the sound source may be a microphone that is configured to collect sound from around. (A fifth configuration.)

According to another aspect of what is disclosed herein, a hearing device includes: a body that is in the form of eyeglasses; a vibrator that is fitted to or unitarily formed with a temple tip such that the vibrator is kept in contact with an auricle cartilage from behind the auricle of the user; and an urging member that is configured to increase the pressing force with which the vibrator is kept in contact with the auricle cartilage. The hearing device thus enables the user to hear sound. (A sixth configuration.)

According to another aspect of what is disclosed herein, a hearing device includes: a body that is in the form of eyeglasses; a vibrator that is fitted to or unitarily formed with a temple tip such that the vibrator is kept in contact with an auricle cartilage from behind the auricle of the user; and a coupler that is configured to allow free choice, among a plurality of temple tips ready for use, of the temple tip that allows sound to be heard best. The hearing device thus enables the user to hear sound. (A seventh configuration.)

According to another aspect of what is disclosed herein, a hearing device includes: a body that is in the form of eyeglasses; and a vibrator that is fitted to or unitarily formed with a temple tip such that the vibrator is kept in contact with an auricle cartilage from behind the auricle of the user. The hearing device thus enables the user to hear sound. Here, the temple tip or a temple, when the user wears the hearing device on his or her head, deforms from its original shape and, when the user completes wearing the hearing device, retrieves the original shape so as to increase the pressing force with which the vibrator is kept in contact with the auricle cartilage. (An eighth configuration.)

According to another aspect of what is disclosed herein, a hearing device includes: a body that is in the form of eyeglasses; a vibrator that is fitted to or unitarily formed with a temple tip such that the vibrator is kept in contact with an auricle cartilage from behind the auricle of the user; and a hinge that is configured to let the vibrator or the temple tip pivot so as to increase the pressing force with which the vibrator is kept in contact with the auricle cartilage. The hearing device thus enables the user to hear sound. (A ninth configuration.)

Advantageous Effects of Invention

According to the invention disclosed herein, it is possible to provide a hearing device that is user-friendly.

DESCRIPTION OF EMBODIMENTS

<Novel Findings>

Figure 1:
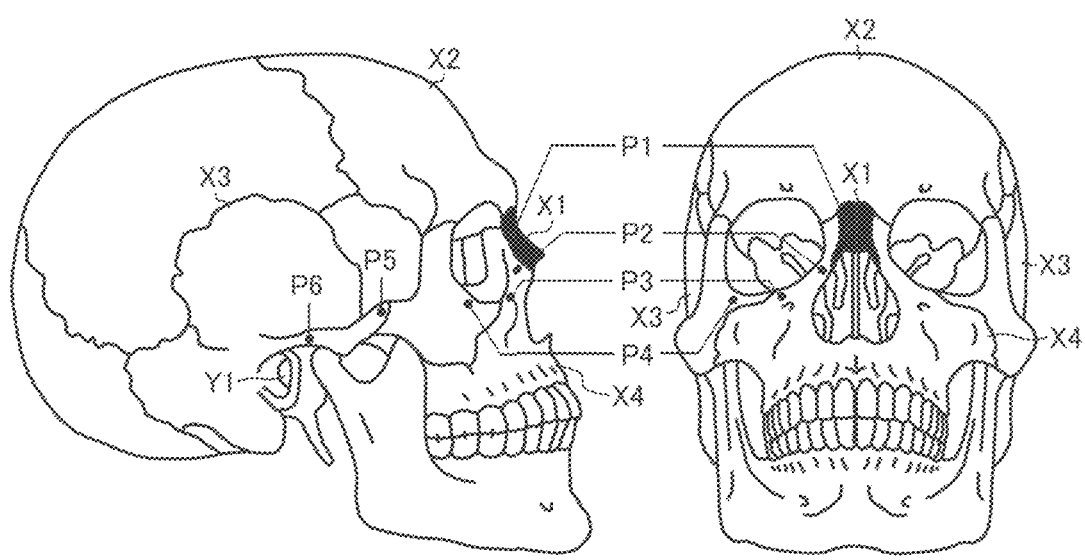
FIG. 1 is an anatomical diagram of the skull.
Figure 2:
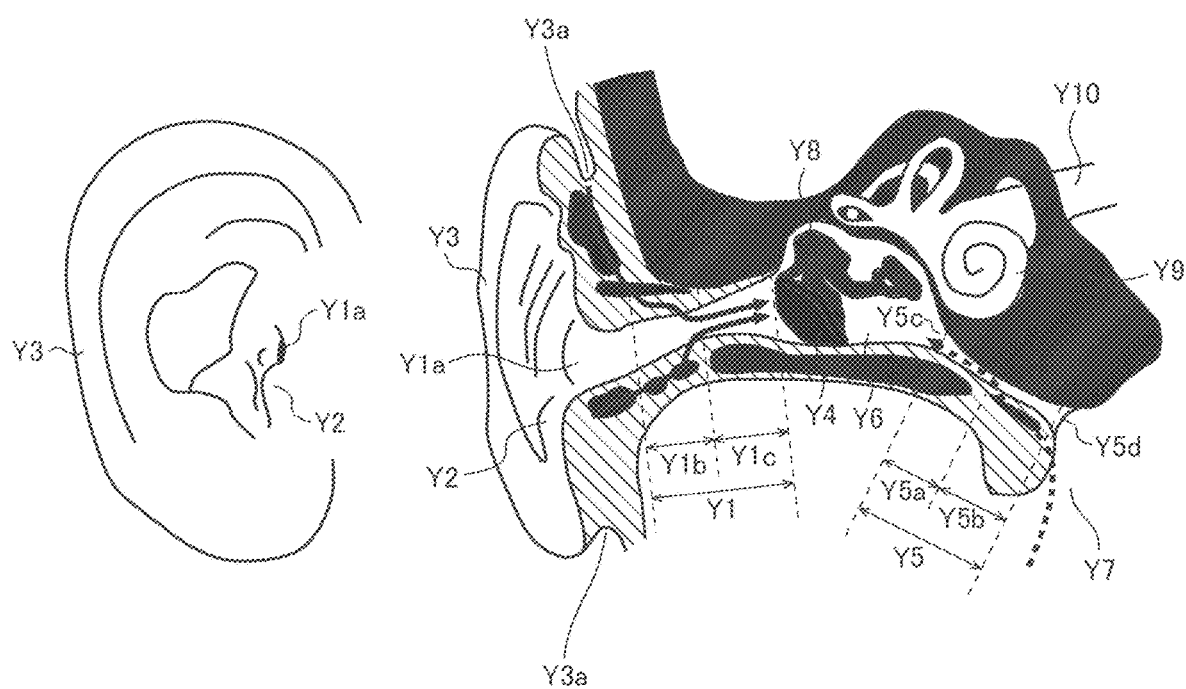
FIG. 2 is an anatomical diagram of the ear.

Prior to a description of hearing devices according to the present disclosure, first, a description will be given, with reference to FIGS. 1 and 2, of novel findings on the hearing mechanism unveiled through intensive studies by the present inventors. FIG. 1 is an anatomical diagram of the skull, and FIG. 2 is an anatomical diagram of the ear.

Being ENT (ear-nose-throat) doctors, the present inventors were the first in the world to discover the novel hearing mechanism (a third hearing mechanism different from either air conduction or bone conduction; see the thick solid-line arrows in FIG. 2) that works as follows: when a vibrator is put on the tragus Y2 or the auricle Y3, which is cartilaginous tissue that surrounds the ear canal entrance Y1a (in particular, the auricle cartilage Y3a at the back of the auricle Y3, a part of it near the ear canal entrance Y1a), the vibration conducts to the cartilaginous ear canal Y1b (about one half of the ear canal (external acoustic meatus) Y1, an outer part of it near the ear canal entrance Y1a); then air-conduction sound (compression waves in air resulting from acoustic vibration) that emanates from the inner surface of the cartilaginous ear canal Y1b passes through the bony ear canal Y1c (about one half of the ear canal Y1, an inner part of it near the eardrum Y4) and reaches the eardrum Y4; thus sound is heard. The present inventors named this hearing mechanism cartilage Conduction®, and have been proposing its uses in cellular telephones and hearing aids.

Unlike what is known as bone conduction, which relies on vibration of heavy members such as the forehead bone and the temporal bone, cartilage Conduction® mentioned above allows sound to be heard by vibration of lighter members such as the tragus Y2 and the auricle Y3, and this keeps the driving energy for the vibrator extremely low.

Unlike what is known as air conduction (the phenomenon in which sound is heard as a result of air-conduction sound entering from outside the ear canal entrance Y1a and vibrating the eardrum Y4), cartilage Conduction® is accompanied by a phenomenon (closed ear canal effect) in which closing the ear canal entrance Y1a with a finger or the like causes an increase in the acoustic energy inside the ear canal Y1 and causes sound to be heard louder. Thus, with the ear canal entrance Y1a closed, sound can be heard clearly even in an environment with loud ambient noise.

To obtain further findings applicable to hearing devices, the present inventors have performed experiments in which the vibrator mentioned above is put in contact not only with cartilage tissue surrounding the ear canal entrance Y1a but with different parts of the head to study variation, from one such part to another, of how sound is heard.

More specifically, as indicated as parts P1 to P6 in FIG. 1, while the vibrator was put in contact with a plurality of parts P1 to P6 sequentially on a path leading from the nasal bone X1 (i.e., part. P1) across the lower edge of the eye orbit (i.e., parts P2, P3, and P4) via the malar arch (i.e., part P5) to short of the tragus Y2 (i.e., part P6), sound such as voices and music was heard and the intensity of the sound was compared.

The experiments provided the finding that sound was heard loudest when the vibrator was put on the nasal bone X1 (i.e., part 1), which was located the farthest from the ear (P1>>>P2 to P6). Incidentally, putting the vibrator on the tragus Y2 results in sound being heard markedly loud; this is what the present inventors have been proclaiming as one of the characteristics of cartilage Conduction®.

In contrast to cartilage Conduction®, with which putting the vibrator on the ear cartilage of the left ear results in sound being heard only in the left ear and putting the vibrator on the ear cartilage of the right ear results in sound being heard only in the right ear, the above-mentioned experiments provided the finding that putting the vibrator on either the left or right part of the nasal bone X1 resulted in sound being clearly heard in both ears.

The above-mentioned experiments also provided the finding that, as with cartilage Conduction®, the closed ear canal effect was observed.

The present inventors further performed supplementary experiments in which the vibrator was put on soft tissue in the eye and the cheek, and obtained the finding that even that resulted in sound, though somewhat feeble, being heard in both ears.

<Proof of Non-Involvement of Bone Conduction>

At first glance, the phenomenon "putting a vibrator on the nasal bone X1 allows sound to be heard" appears to be achieved by a kind of what is known a bone conduction. Actually, however, the hearing mechanism achieved by application of vibration to the nasal bone X1 is ascribable to a phenomenon completely different from conventional bone conduction. The reasons are as follows.

Commonly used as parts in contact with which to put a vibrator for bone conduction are the forehead bone X2 and the temporal bone X3 (in particular the mastoid part, the malar arch, and the like), and the upper jawbone X4 can very rarely be used (hereinafter, these are collectively referred to as the bones X2 to X4). However, no examples have ever been known where a vibrator for bone conduction was put in contact with the nasal bone X1, which is farther from the ear than any of the bones X2 to X4 is, and is thus the farthest from the ear.

With bone conduction, as the above-mentioned bones X2 to X4 vibrate, the lymph fluid in the middle ear (cochlea) Y9 moves, and this produces in the middle ear Y9 a sound signal, which is delivered to the brain. Tracing the bridge of the nose from bottom up with a finger leads to the lowest point of a hollow, and going further is accompanied by increasing height. With a boundary assumed at the hollow, below lies the nasal bone X1 and above lies the forehead bone X2. Farther below the nasal bone X1 is nasal cartilage (lateral nasal cartilage, greater alar cartilage, and lesser alar cartilage).

Checking how sound is heard while a vibrator is slid along the bridge of the nose from bottom up reveals that, while no sound is heard in the region of nasal cartilage, sound is heard well in the region of the nasal bone X1. Going past the lowest point of the hollow into the region of the forehead bone X2 results in sound being heard clearly less distinctly than in the region of the nasal bone X1.

Audiometric tests at an ENT clinic involves air-conduction tests using headphones as well as bone-conduction tests using a vibrator for boric conduction. The part with which the vibrator is put in contact during those tests is the forehead bone X2 or the mastoid part of the temporal bone X3. A vibrator for bone conduction is driven with a large amount of energy, and thus can vibrate large members such as the forehead bone X2 and the temporal bone X3, thereby achieving bone-conduction tests.

On the other hand, the vibrator for cartilage conduction that was used in the previously described experiments is driven with so small an amount of energy that it cannot vibrate the entire forehead bone X2 and thus cannot be used in bone-conduction tests. Even so, with the vibrator in contact with the nasal bone X1, sound was heard. Moreover, although being farther from the ear than are the bones X2 to X4, the nasal bone X1, when vibration is applied to it, allowed sound to be heard well.

These observations indicate that sound is heard not by bone conduction, which requires movement of the skull to allow sound to be heard, but by another hearing mechanism that allows sound to be heard without movement of the skull. That is, the observations indicate that the mechanism of hearing by application of vibration to the nasal bone X1 is different from what is known as bone conduction.

<Studies on the Mechanism of Hearing>

Next, as to the mechanism of hearing by application of vibration to the nasal bone X1, a few possibilities that are considered plausible at the time of wiring will be studied.

[First Possibility]

A first possibility: sound is heard from the nasal bone X1 via the auditory tube (Eustachian tube) Y5. The auditory tube Y5 is a tubular organ that connects between the ear (tympanic cavity Y6) and the nose (upper pharynx Y7), and is composed of the bony auditory tube Y5a, constituting an ear-side (tympanic cavity Y6-side) part, and the cartilaginous auditory tube Y5b, constituting a nose-side (upper pharynx Y7-slide) part. The tympanic cavity Y6 is open through the tympanic opening Y5c of the auditory tube, and the upper pharynx Y7 is open through the pharyngeal opening Y5d of the auditory tube. The auditory tube Y5 is normally closed; it opens during swallowing to send air to the tympanic cavity Y6, serving the function of adjusting the pressure inside the middle ear.

One way of conducting auditory tube function tests at ENT clinics is by sonotubometry. A probing tone is emitted from behind the nose, in the rhinopharynx, and the sound level is measured with a microphone provided in the ear canal; swallowing causes the auditory tube to open wide, resulting in an increase in the sound level, and this is taken as an index for evaluation of the auditory tube function. This implies the following two facts. First, air-conduction sound, of which the sound source is located in the rhinopharynx, passes through the auditory tube to reach the middle ear cavity, so that air-conduction sound from the middle ear cavity side makes the eardrum vibrate, with the result that air-conduction sound induced inside the ear canal by the vibration can be measured at the ear canal side. Here, the subject hears the air-conduction sound resulting from the eardrum vibrating. Second, the air-conduction sound measured inside the ear canal increases when the auditory tube opens wide.

If, for the sake of discussion, the vibration imparted from the vibrator to the nasal bone X1 conducts to the nasal cavity, and the air-conduction sound generated inside the nasal cavity conducts from the upper pharynx Y7 via the pharyngeal opening Y5d of the auditory tube through the auditory tube Y5 to reach, via the tympanic opening Y5c of the auditory tube, the tympanic cavity Y6, then the sound heard should become louder when swallowing causes the auditory tube Y5 to open. In reality, however, the sound did not become louder. Moreover, by a principle similar to the closed ear canal effect, closing the nose and the mouth results in an increase in the acoustic energy that passes into the auditory tube Y5, and this should make the sound heard louder. In reality, however, the sound did not become louder.

In view of the foregoing, this hearing mechanism—vibration of the nasal bone X1 generates air-conduction sound inside the nasal cavity and this conducts across the air in the auditory tube Y5 to reach the tympanic cavity Y6—is not quite reasonable. Even so, it may still be possible that vibration of the nasal bone X1 makes, via the tissue inside the nasal cavity, cartilage in the auditory tube Y5 (i.e., the cartilaginous auditory tube Y5b) vibrate and this vibration generates air-conduction sound inside the auditory tube Y5.

The auditory tube Y5 is normally closed, and the bony auditory tube Y5a is filled with air. When the cartilaginous auditory tube Y5b vibrates, its vibration generates air-conduction sound inside the auditory tube Y5. The air-conduction sound is considered to be generated mainly in the inner cavity of the bony auditory tube Y5a. When the air-conduction sound generated reaches the tympanic cavity Y6, the air-conduction sound pressure from the tympanic cavity Y6 causes the eardrum Y4 to vibrate; thus the auditory ossicles Y8 vibrate and move the lymph fluid in the middle ear Y9, thereby moving the hair cells, which are the cells responsible for hearing. In this way, sound information is delivered to the cochlea nerves (see the thick broken-line arrows in FIG. 2).

This hearing mechanism is similar to what the present inventors propose as cartilage Conduction®—the phenomenon in which vibration of the cartilaginous ear canal Y1b generates air-conduction sound inside the ear canal Y1—, and is a phenomenon completely differently from what is generally known as bone conduction.

As mentioned previously, with cartilage Conduction®, putting a vibrator on cartilage tissue surrounding the ear canal entrance Y1a causes the cartilaginous ear canal Y1b to vibrate to generate air-conduction sound inside the ear canal Y1, and the air-conduction sound conducts to the eardrum Y4, allowing sound to be heard.

A similar mechanism is considered to be at work with the hearing mechanism achieved by application of vibration to the nasal bone X1: putting a vibrator to the nasal bone X1 causes, via tissue inside the nose, the cartilaginous auditory tube Y5b to vibrate to produce air-conduction sound inside auditory tube Y5 and/or Y4, and the air-conduction sound conducts to the eardrum Y4, allowing sound to be heard.

Vibration of the nasal bone X1 conducts via the nasal cavity to reach the auditory tube Y5 (cartilaginous auditory tube Y5b) in both the left and right ears. This agrees with the finding that putting a vibrator in contact with either the left or the right nasal bone X1 allows sound to be heard in both ears.

In the experiments described previously, the closed ear canal effect was observed. The reason is considered to be that, when the air-conduction sound generated inside the auditory tube Y5 and/or tympanic cavity Y6 makes the eardrum Y4 vibrate, the vibrating eardrum Y4 produces air-conduction sound inside the ear canal Y1 and here, with the ear canal Y1 closed, the energy of the air-conduction sound produced inside the ear canal Y1 is not released to the outside.

[Second Possibility]

Plausible as a second possibility is a hearing mechanism in which vibration of the nasal bone X1 is conducted to tissue, such as bone, around it and the vibration eventually conducts to the cartilaginous ear canal Y1b on both the left and right sides to produce air-conduction sound inside the ear canal Y1. That is, with this mechanism, except that the part which the vibrator is put in contact is the nasal bone X1, sound is heard by what the present inventors have been proposing as cartilage Conduction®.

It should be noted that, when the contact pressure between the vibrator and a bone is constant, the larger the mass of the bone, the more difficult it is to vibrate, and the smaller the mass of the bone, the easier it is to vibrate. That is, with the vibrator put on a bone with a large mass, the vibrator needs to be driven with energy high enough to vibrate the bone satisfactorily. The reason is considered to be that, the larger the mass of a bone, the poorer the efficiency of transfer of energy from the vibrator to the bone. By contrast, with the vibrator put on a bone with a small mass, energy is transferred efficiently from the vibrator to the bone, and thus, even when the vibrator is driven with low energy, it can vibrate the bone satisfactorily.

In the context of the experiments described previously, the nasal bone X1, which is thinner and lighter than the bones X2 to X4, receives energy from the vibrator efficiently, and vibrates well. If the nasal bone X1 can be vibrated sufficiently, its vibration efficiently conducts to the surrounding heavier bones X2 to X4. Thus, rather than directly vibrating the bones X2 to X4 nearer to the ear, vibrating the nasal bone X1 farther from the ear results in producing stronger vibration in the cartilaginous ear canal Y1b, thereby allowing sound to be heard louder.

In fact, the present inventors have as ENT doctors experienced examples in which, with an ear with bony ear canal closure, rather than putting a vibrator on a bony part to directly vibrate it, putting the vibrator on a cartilaginous part to first vibrate it so that its vibration indirectly vibrates a bony part resulted in better sound conduction to the middle ear. On the other hand, with an implanted bone-conduction hearing aid (what is known as a BAHA [bone anchored hearing aid]), a bolt is implanted in the skull, and a bone-conduction vibrator is attached to the bolt to conduct sound. This indicates that, rather than conducting sound directly from the bone-conduction vibrator to the skull, conducting it via a bolt interposed between the bone-conduction vibrator and the skull results in better sound conduction. The present inventors believe that the previously-described hearing mechanism relies on a principle similar to that underlying these observations.

[Third Possibility]

Lastly, plausible as a third possibility is a hearing mechanism in which vibration of the nasal bone X1 vibrates the contents of the eye orbit then vibrates the cerebral spinal fluid and this vibration conducts to the lymph fluid in the middle ear Y9, moving the hair cells and producing sound sensation.

Also with this hearing mechanism, it is considered that, rather than directly vibrating the bones X2 to X4 nearer to the ear, vibrating the nasal bone X1 farther from the ear produces larger vibration in the contents of the eye orbit (and hence in the cerebral spinal fluid), allowing sound to be heard even louder.

The reason that the closed ear canal effect was observed is considered to be that, when vibration of the lymph fluid conducted via the auditory ossicles Y8 to the eardrum Y4, the vibration of the eardrum Y4 produced air-conduction sound inside the ear canal Y1.

Hereinafter, novel hearing devices that are devised based on the findings discussed above will be proposed.

<Hearing Device (First Embodiment)>

Figure 3:
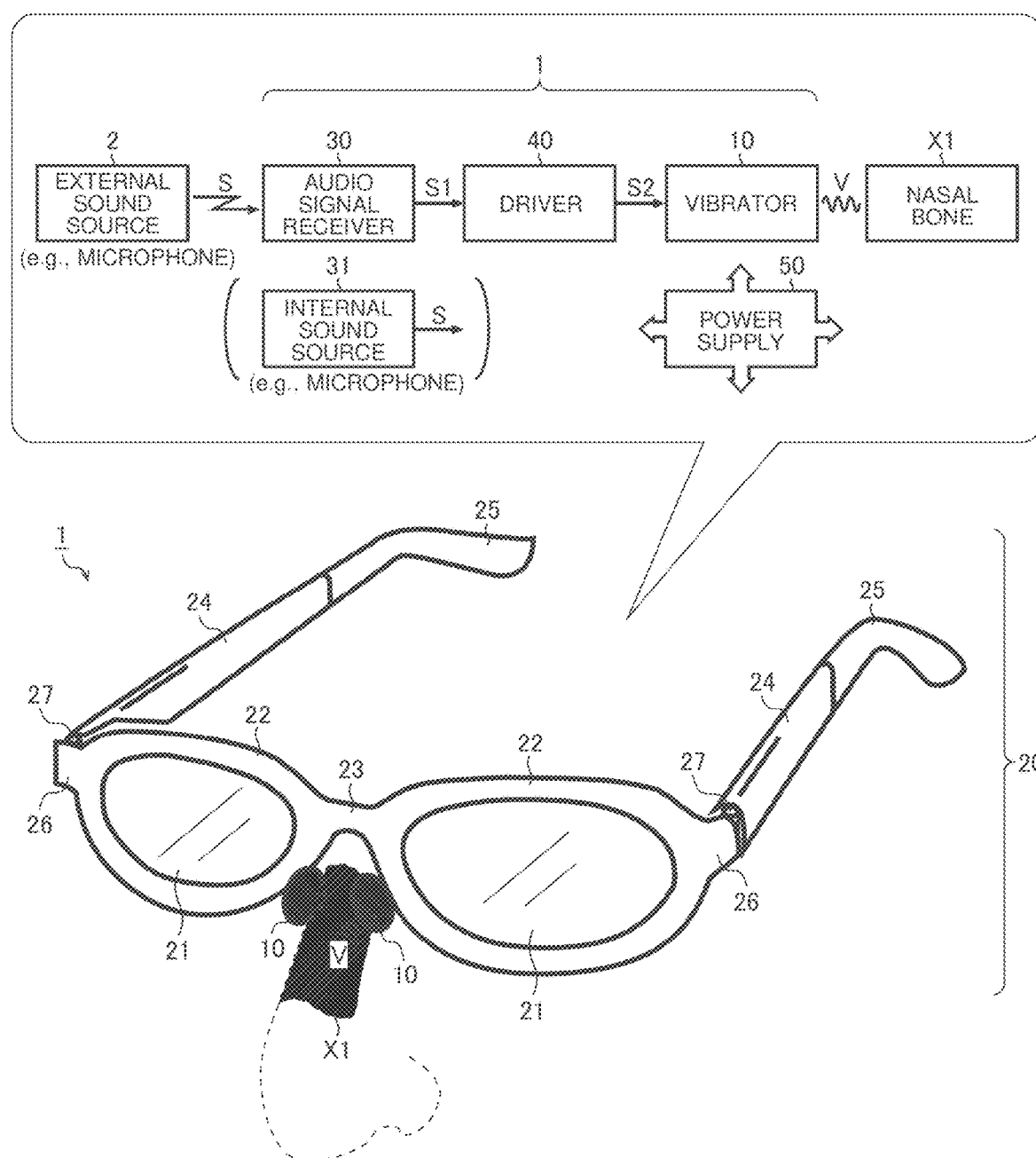
FIG. 3 is a diagram showing a hearing device according to a first embodiment.

FIG. 3 is a diagram showing a hearing device according to a first embodiment. The hearing device 1 of this embodiment is for use as a hearing aid or a sound collector; or a telephony headset for a smartphone or a computer terminal; or headphones for a music player; or the like. The hearing device 1 includes vibrators 10 and a body 20 in the form of eyeglasses.

The vibrators 10 are members that conduct vibration V according to an audio signal S (i.e., an electrical signal containing sound information) to the nasal bone X1 of a user. Suitably usable as the vibrators 10 are, for example, piezoelectric bimorphs or electromagnetic vibrators. Here, the energy with which the vibrators 10 are driven is so feeble as not to directly vibrate the forehead bone X2, the temporal bone X3, or the like, which are large and heavy, but is strong enough to vibrate the nasal bone X1, which is thin and light.

The body 20 includes lenses 21, rims (grooved frames) 22, a bridge (nose rest) 23, temples (beams) 24, temple tips (ear rests) 25, end pieces 26, and hinges 27. The lenses 21 comprise a left one and a right one, and each may or may not have a vision correction function (diopter) or any other special function (light-shielding, anti-glare, polarizing, color vision correction, etc.). The body 20 may not have any function related to vision such as the lenses 21. The rims 22 keep the lenses 21 in position. The bridge 23 couples the left and right lenses together. The temples 24 support the rims 22 at the left and right of the head. The temple tips 25 are provided at the distal ends of the temples 24, and are hung on the ears. The end pieces 26 are provided at opposite ends of the rims 22, and are coupled to the proximal ends of the temples 24. The hinges 27 couple the temples 24 and the end pieces 26 together so that these are foldable with respect to each other.

Here, the body 20 holds the vibrators 10 at positions where the nose pads of eyeglasses would be provided, that is, at positions where the vibrators 10 hold the user's nose (in particular, the nasal bone X1) from opposite, left and right, sides. The vibrators 10 may be fitted directly to the rims 22 or the bridge 23, or may be fitted via unillustrated pad arms (clings). The vibrators 10 may be provided so as to overlap existing nose pads, or may be provided as nose pads having a vibrating function. The vibrators 10 have only to be in contact with at least one of the left and right parts of the nasal bone X1.

As shown in a balloon at the top of FIG. 3, the body 20 incorporates, as various electrical circuits for driving the vibrators 10, an audio signal receiver 30, a driver 40, and a power supply 50, which are provided in different parts spread across the body 20.

The audio signal receiver 30 receives, on a wireless (or wired) basis, an audio signal S produced by an external sound source 2, and outputs a reception signal S1. The driver 40 subjects the reception signal S1 to predetermined signal processing (such as amplification and wave shaping) to produce a drive signal S2, and by using it drives the vibrators 10. The power supply 50 is a means for supplying electric power to different parts in the body 20. Suitably usable as the power supply 50 is a primary or secondary battery such as a button battery. Instead of the audio signal receiver 30, an internal sound source 31 may be incorporated that itself produces the audio signal S and feeds it, instead of the reception signal S1, to the driver 40.

With the hearing device 1 of this embodiment, owing to the previously-studied hearing mechanism achieved by application of vibration to the nasal bone X1, the user can hear sound clearly in both ears. In particular, with the hearing device 1, which has the vibrators 10 at positions where nose pads would be provided, the device's own weight helps increase the pressing force under which the vibrators 10 are kept in contact with the nasal bone X1. It is thus possible to avoid an unnecessary increase in the driving energy for the vibrators 10.

When the hearing device 1 is used as a hearing aid or a sound collector, the external sound source 2 or the internal sound source 31 can be a microphone that collects sound from around. With this configuration, the hearing device 1 can, by driving the vibrators 10 with the sound collected by the microphone and then amplified and processed, allow a user with impaired hearing to hear sound clearly.

In particular, unlike an ear-hook hearing aid or sound collector, the hearing device 1 in the form of eyeglasses appears at first glance to be common eyeglasses. Thus, the user can aid his or her hearing in a very natural way without being noticed by people nearby.

Conventionally, people with hearing loss that cannot be relieved with common air-conduction hearing aids, such as with ear canal atresia, are administered bone-conduction hearing aids. A vibrator for bone conduction, however, is extremely difficult to fasten. A common part with which the vibrator of a bone-conduction hearing aid is kept in pressed contact is the mastoid part of the temporal bone. This is a part on which a vibrator is difficult to fasten stably. Hence the various measures conventionally contrived: placing the vibrator inside a temple of eyeglasses, adopting a headband-like design, fastening the vibrator with a semi-circular spring, etc. All this results from a vibrator being kept in contact with the mastoid part. As one solution, an implanted bone-conduction hearing aid (what is known as a BAHA) is commercially available of which a vibrator is fixed to a screw that is screwed into the skull.

Thus, although hearing aids in the form of eyeglasses have long been in practical use, they all enable hearing of sound by what is commonly known as bone conduction, and none of them allows hearing of sound with a vibrator put in contact with the nasal bone. This indicates that no one has ever been aware that the nasal bone is the part preferable to any other parts with which to put a vibrator in contact, and thus attests to the novelty of the hearing device 1 of this embodiment.

This embodiment deals with an example where the vibrators 10 and the various electrical circuits (the audio signal receiver 30 or the internal sound source 31, the driver 40, and the power supply 50) are built into the body 20 in the form of eyeglasses. Instead, those components may be configured to be removably attached to a commercially available pair of eyeglasses.

In the present description, the term "eyeglasses" should be understood in a wide sense covering all implements worn on the face (in front of the eye), including VR (virtual reality) goggles and VR headsets.

The vibrators 10 do not necessarily have to be used together with the body 20 in the form of eyeglasses: so long as a vibrator can be appropriately kept in contact with at least one of the left and right parts of the nasal bone X1, the body that holds the vibrator 10 can be in any shape, such as in the form of a nose clip or in the form of a nostril expanding strip.

<Hearing Device (Second Embodiment)>

Figure 4:
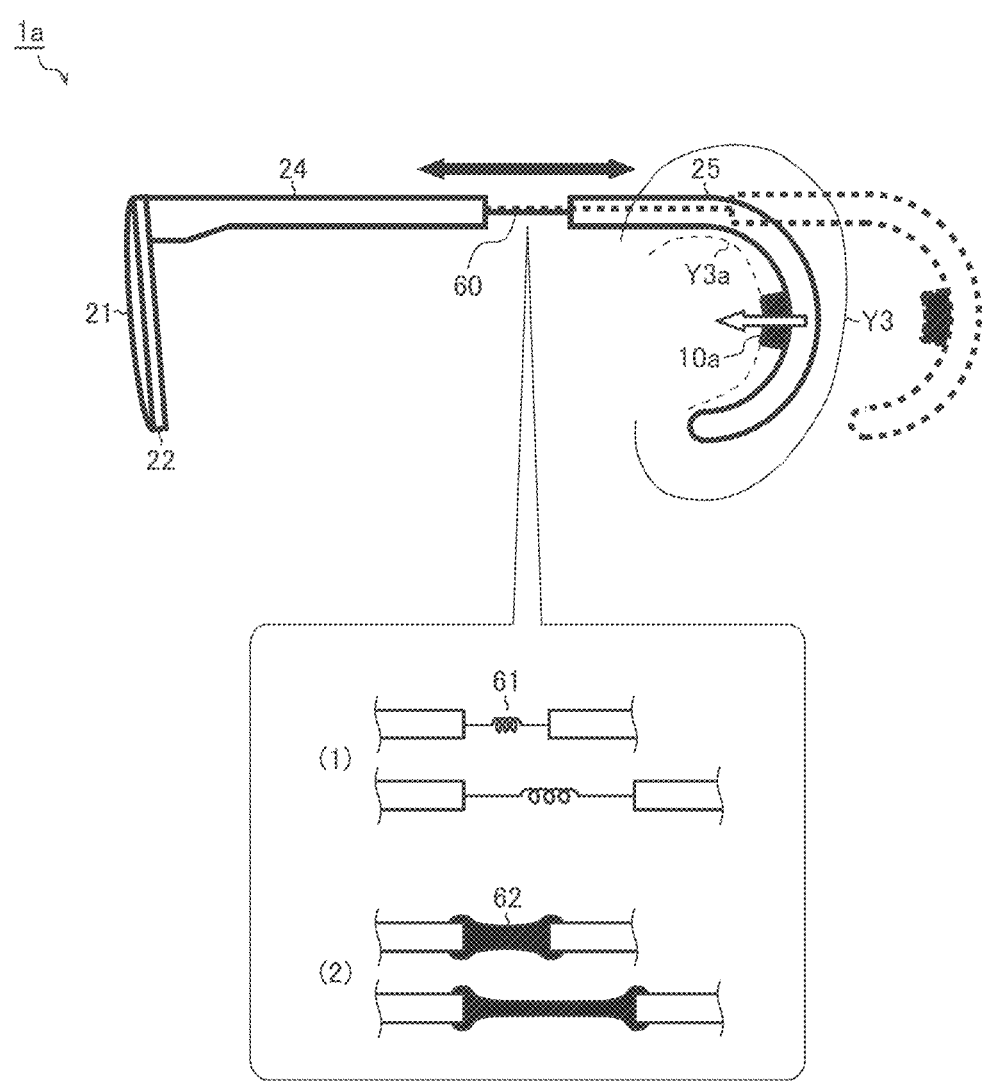
FIG. 4 is a diagram showing a hearing device according to a second embodiment.

FIG. 4 is a diagram showing a hearing device according to a second embodiment. The hearing device 1a of this embodiment, like that of the first embodiment (FIG. 3), is in the form of eyeglasses, but has, instead of the vibrators 10 put in contact with the nasal bone X1, a vibrator 10a that is attached to at least one of the left and right temple tips 25 so as to be in contact with the auricle cartilage Y3a (in particular, a part of it near the ear canal entrance Y1a) from behind the auricle Y3. That is, the hearing device 1a allows sound to be heard clearly by what the present inventor have been proposing as cartilage Conduction®.

Incidentally, in common eyeglasses, the temple tips are configured to apply pressure not in the direction of the auricle but in the direction of the skull (temporal bone). In addition, the distal ends of the temple tips point not in the direction of the auricle cartilage but, in the direction of the back of the head. This design is reasonable considering that the temple tips (or the temples) are meant to hold the eyeglasses.

However, the design mentioned just above is unfavorable to conduction of vibration to the auricle cartilage Y3a at the back of the auricle Y3. Specifically, the vibrator 10a attached to the temple tip 25 needs to be in contact with the auricle cartilage Y3a at the back of the auricle Y3, which is located not in the direction of the back of the head but rather below. Also the vibrator 10a should apply pressure not in the direction of the skull but in the direction of the auricle cartilage Y3a.

Out of the above considerations, the hearing device 1 includes, as a component distinctive of this embodiment, an urging member 60 for increasing the pressing force under which the vibrator 10a is kept in contact with the auricle cartilage Y3a from behind the auricle Y3. More specifically, the urging member 60 is an elastic member provide between the temple 24 and the temple tip 25. When the user wears the hearing device 1a on the head, the urging member 60 is expanded along the front-rear axis; when the user completes wearing the device 1a, the urging member 60 retrieves its original length by its own elastic force (see the parts indicated by solid and broken lines along with the solid-black arrows in FIG. 4). As shown in a balloon at the bottom of FIG. 4, suitably usable as the urging member 60 is a coil spring 61, a rubber tube 62, or the like.

With this structure, once the hearing device 1a is worn, the vibrator 10a receives a pressing force acting in the direction of the front of the head (the force exerted by the urging member 60 tending to contract; see the hollow arrow in FIG. 4). Thus, with an increased pressing force the vibrator 10a is kept in contact with the auricle cartilage Y3a from behind the auricle Y3, permitting efficient conduction of vibration to the auricle cartilage. This helps avoid an unnecessary increase in the driving energy for the vibrator 10a.

This embodiment deals with an example where the urging member 60 is provided between the temple 24 and the temple tip 25. Instead, for example, the temple 24 may be divided into two parts so that the urging member 60 can be arranged between those two parts. For another example, the temple tip 25 may be divided into two parts so that the urging member 60 can be arranged between those two parts. For another example, the urging member 60 may be arranged between a rim 22 (end piece 26) and a temple 24. For another example, a temple tip 25 and the vibrator 10a may be formed unitarily. A temple tip formed unitarily with the vibrator 10a may be molded in a shape (e.g., a curved shape) that permits the vibrator 10a itself to function as a temple tip 25, or may be fabricated by building (embedding) a small vibrator 10a into a temple tip 25.

<Hearing Device (Third Embodiment)>

Figure 5:
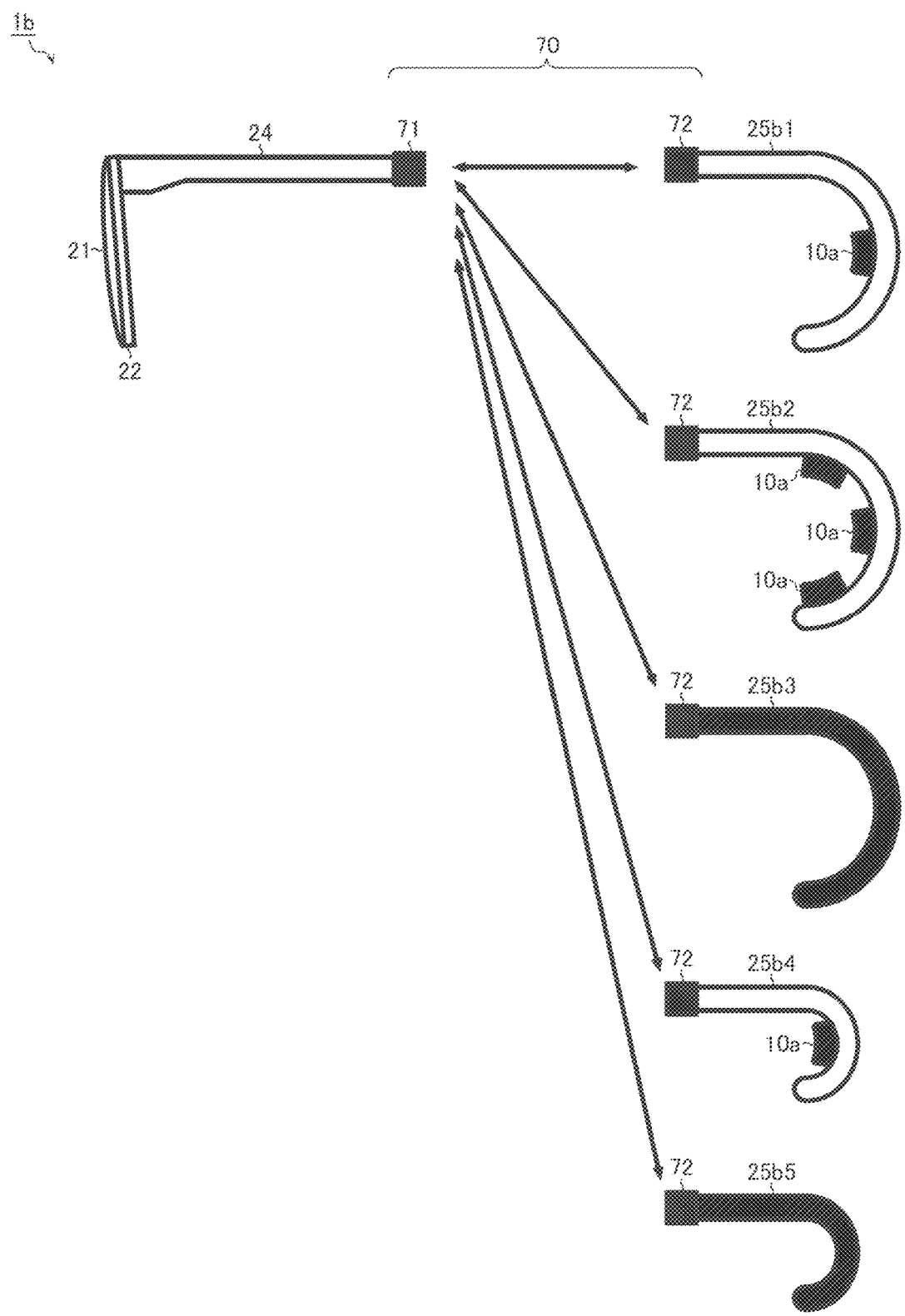
FIG. 5 is a diagram showing a hearing device according to a third embodiment.

FIG. 5 is a diagram showing a hearing device according to a third embodiment. The hearing device 1b of this embodiment, like that of the second embodiment (FIG. 4), is in the form of eyeglasses and employs a vibrator 10a to allow sound to be heard by cartilage Conduction®, but includes, instead of the urging member 60 mentioned previously, a coupler 70 (a temple-side coupler segment 71 and a tip-side coupler segment 72).

The temple-side coupler segment 71 is provided at the distal end of a temple 24. On the other hand, the tip-side coupler segment 72 is provided at the proximal end of each of a plurality of temple tips 25b1 to 25b5 with different shapes and sizes. The temple-side and tip-side coupler segments 71 and 72 are provided with a mechanism that permits them to join and disjoin with and from each other.

The different temple tips compare as follows. The temple tips 25b1 and 25b5 have the same size, but have different numbers (one and three) of vibrators 10a. The temple tips 25b1 and 25b3 have the same size, but the temple tip 25b3 is of a type formed unitarily with a vibrator (i.e., configured such that the temple tip itself functions as a vibrator 10a). The temple tips 25b1 and 25b4 have the same number of vibrators 10a, but their respective temple tips are differently sized (large and small). The temple tips 25b3 and 25b5 are both of a type formed unitarily with a vibrator, but are differently sized (large and small).

With this design in which, out of a plurality of temple tips 25b1 to 25b5 with different shapes and sizes ready for use, one is attached to the temple 24, the user can freely select, according to the condition of his or her ear, the temple tip that allows sound to be heard best (i.e., the temple tip that achieves the most efficient conduction of vibration of the vibrator 10a to the auricle cartilage Y3a from behind the auricle Y3).

This embodiment deals with an example where the coupler 70 is provided between the temple 24 and the temple tip 25. Instead, for example, the coupler 70 may be provided between the rim 22 (end piece 26) and the temple 24 to allow choice among a plurality of sets each comprising a temple 24 and a temple tip 25.

<Hearing Device (Fourth Embodiment)>

Figure 6:
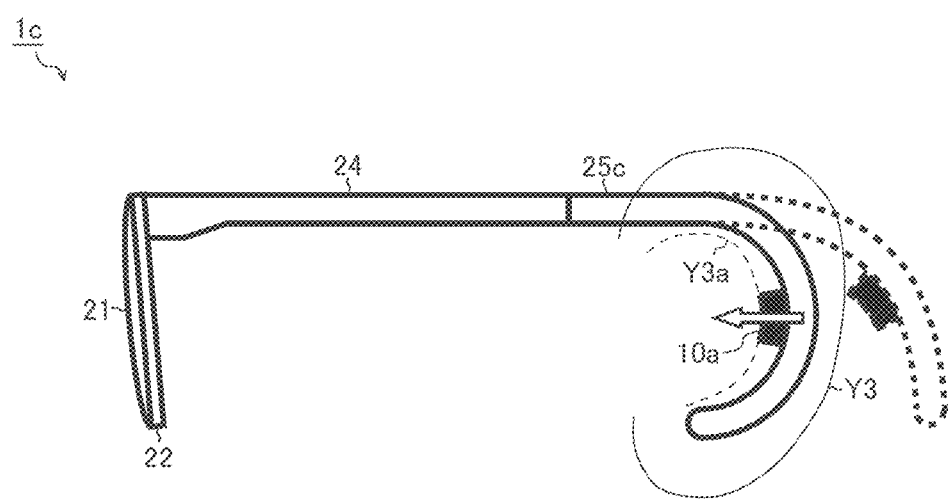
FIG. 6 is a diagram showing a hearing device according to a fourth embodiment.

FIG. 6 is a diagram showing a hearing device according to a fourth embodiment. The hearing device 1c of this embodiment, like those of the second embodiment (FIG. 4) and the third embodiment (FIG. 5), is in the form of eyeglasses and employs a vibrator 10a to allow sound to be heard by cartilage Conduction®, but has, instead of the urging member 60 or the coupler 70 described previously, an ingeniously configured temple tip 25c.

More specifically, the temple tip 25c is configured to be flexible and shape-recovering. When the user wears the hearing device 1c on the head, the temple tip 25c deforms such that its curved part uncurls; when the user completes wearing the device 1c, the temple tip 25c retrieves its original curved shape by its own shape-recovering ability (see the parts indicated by solid and broken lines in FIG. 6). Suitably usable as the material for the temple tip 25c is, for example, metal wire or rubber.

With this structure, once the hearing device 1c is worn, the hearing device 1c receives a pressing force acting in the direction of the front of the head (i.e., the force exerted by the temple tip 25c tending to return to the curved state; see the hollow arrow in FIG. 6). Thus, with an increased pressing force the vibrator 10a is kept in contact with the auricle cartilage Y3a from behind the auricle Y3, permitting efficient conduction of vibration. This helps avoid an unnecessary increase in the driving energy for the vibrator 10a.

This embodiment deals with an example where the temple tip 25c is configured to be flexible and shape-recovering. Instead, a temple 24 may be configured to have similar properties; this too permit the vibrator 10a to be kept in firmer contact with the auricle cartilage Y3a from behind the auricle Y3.

<Hearing Device (Fifth Embodiment)>

Figure 7:
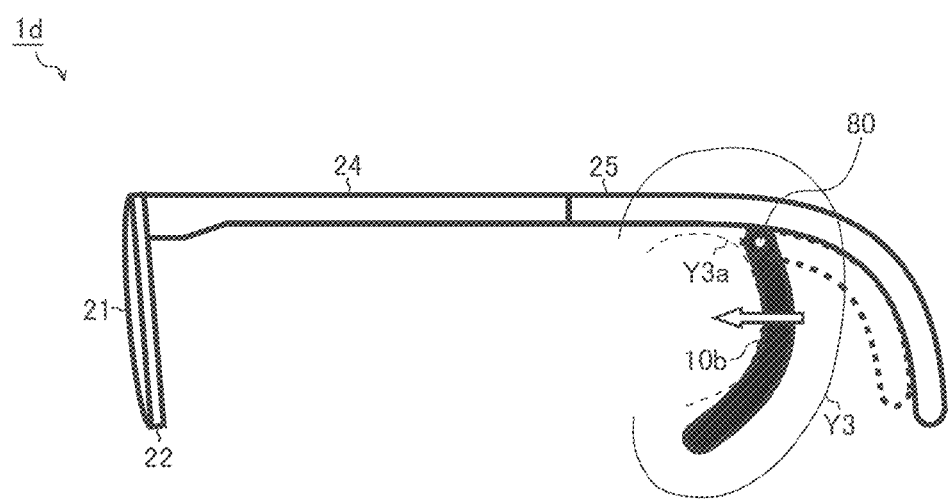
FIG. 7 is a diagram showing a hearing device according to a fifth embodiment.

FIG. 7 is a diagram showing a hearing device according to a fifth embodiment. The hearing device 1d of this embodiment, like those of the second embodiment (FIG. 4), the third embodiment (FIG. 5), and the fourth embodiment (FIG. 6), is in the form of eyeglasses and employs a vibrator 10a to allow sound to be heard by cartilage Conduction®, but is characterized by having, instead of the urging member 60 or the coupler 70 described previously, a hinge 80. The following description focuses on the function of the hinge 80.

As shown in FIG. 7, the temple tip 25 is, in a distal end part, of it, fitted with a vibrator 10b molded in a curved shape such that the vibrator 10b is pivotable via a hinge 80. The vibrator 10b may be coupled to the hinge 80 directly, or may be coupled to the hinge 80 via a separate support member (unillustrated). The temple tip 25 and the vibrator 10b are given appropriate curvatures preferably with consideration given to the fittability of the hearing device 1d.

With this structure, when the user wears the hearing device 1d on the head, the vibrator 10b can be flipped up in the direction of the temple tip 25, and this makes the hearing device 1d easy to wear; when the user completes wearing the hearing device 1d, the vibrator 10b can be pulled back down in the direction of the auricle Y3 so that the vibrator 10b can be kept in firm contact with the auricle cartilage Y3a from behind the auricle Y3. This permits efficient conduction of vibration to the auricle cartilage Y3a, and helps avoid an unnecessary increase in the driving energy for the vibrator 10b.

<Hearing Device (Sixth Embodiment)>

Figure 8:
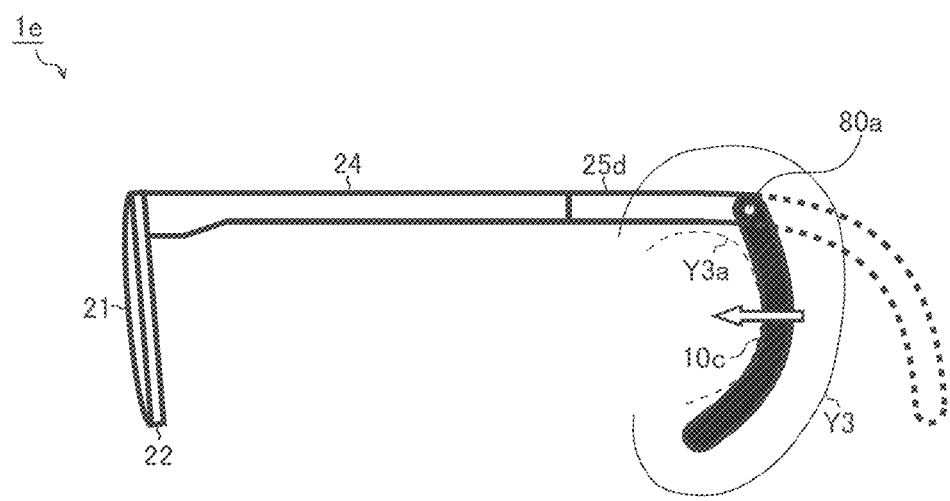
FIG. 8 is a diagram showing a hearing device according to a sixth embodiment.

FIG. 8 is a diagram showing a hearing device according to a sixth embodiment. The hearing device 1e of this embodiment is a modified example of the fifth embodiment (FIG. 7), and includes a hinge 80a that pivotally support a vibrator 10c formed unitarily with (in FIG. 8, a distal end part of) a temple tip 25d (i.e., a temple tip with a vibrator formed unitarily with it).

With this structure, when the user wears the hearing device 1e on the head, the vibrator 10c can be flipped up in the direction opposite from the auricle Y3, and this makes the hearing device 1d easy to wear; when the user completes wearing the hearing device 1e, the vibrator 10b can be pulled back down in the direction of the auricle Y3 so that the vibrator 10b can be kept in firm contact with the auricle cartilage Y3a from behind the auricle Y3. This permits efficient conduction of vibration to the auricle cartilage Y3a, and helps avoid an unnecessary increase in the driving energy for the vibrator 10b.

The fifth embodiment (FIG. 7) and the sixth embodiment (FIG. 8) deal with examples where the vibrators 10b and 10c, respectively, are pivotable. Instead, for example, a hinge may be provided that pivotally supports the previously-described temple tip 25 itself that holds the vibrator 10a (or a distal end part of the temple tip 25).

FURTHER MODIFICATIONS

The various technical features disclosed herein can be implemented in any manner other than specifically described by way of embodiments above, and allow for many modifications within the spirit of the technical ingenuity involved. That is, it should be understood that the embodiments disclosed herein are in every aspect illustrative and not restrictive, and that the technical scope of the present invention is defined not by the description of embodiments given above but by the scope of the appended claims and encompasses any modifications in a sense and scope equivalent to those of the claims.

INDUSTRIAL APPLICABILITY

The invention disclosed herein finds applications in hearing aids and sound collectors; telephony headsets in smartphones and computer terminals; headphones for music players; VR goggles and VR headsets; and the like.

REFERENCE SIGNS LIST 1 hearing device
2 external sound source (such as a microphone)
10 vibrator
20 body
25 temple tip
30 audio signal receiver
31 internal sound source (such as a microphone)
60 urging member
70 coupler
80 hinge
X1 nasal bone

The invention claimed is:
1. A hearing device comprising
a body in a form of eyeglasses;
a hinge fitted to outside a temple tip; and
a vibrator rotatably fitted via the hinge to outside the temple tip,
wherein
one end of the vibrator is fitted to the hinge,
the hearing device is configured such that, as the vibrator rotates, a distance between another end of the vibrator and the temple tip changes, and
as the distance increases, the vibrator comes into contact with an auricle cartilage from behind an auricle of the user and a pressing force with which the vibrator is kept in contact with the auricle cartilage increases,
whereby the hearing device enables the user to hear sound.

* * * * *